(12) United States Patent
Arndt et al.

(10) Patent No.: US 6,903,685 B1
(45) Date of Patent: Jun. 7, 2005

(54) PASSIVE TRACKING SYSTEM AND METHOD

(75) Inventors: G. Dickey Arndt, Friendswood, TX (US); Phong H. Ngo, Friendswood, TX (US); Henry A. Chen, Houston, TX (US); Chau T. Phan, Houston, TX (US); Brian A. Bourgeois, Houston, TX (US); John Dusl, Houston, TX (US); Brent W. Hill, San Diego, CA (US)

(73) Assignee: The United States of America as represented by the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/612,562

(22) Filed: Jul. 1, 2003

Related U.S. Application Data

(63) Continuation-in-part of application No. 09/994,989, filed on Nov. 14, 2001, now Pat. No. 6,618,010.

(51) Int. Cl.[7] .............................. G01S 1/08; G01S 5/04; H01Q 1/00
(52) U.S. Cl. ....................... 342/465; 342/370; 342/442; 342/463
(58) Field of Search ................................ 342/370, 442, 342/463, 465

(56) References Cited

U.S. PATENT DOCUMENTS

| | | | |
|---|---|---|---|
| 5,089,824 A | * | 2/1992 | Uematsu et al. ............ 342/442 |
| 5,400,036 A | * | 3/1995 | Kochiyama et al. ........ 342/370 |
| 5,583,517 A | * | 12/1996 | Yokev et al. ............... 342/442 |
| 5,602,833 A | | 2/1997 | Zehavi |
| 5,621,752 A | | 4/1997 | Antonio et al. |
| 5,691,974 A | | 11/1997 | Zehavi et al. |
| 5,859,612 A | | 1/1999 | Gilhousen |
| 5,914,949 A | | 6/1999 | Li |
| 5,987,016 A | | 11/1999 | He |
| 6,147,641 A | | 11/2000 | Issler |
| 6,377,210 B1 | * | 4/2002 | Moore .................... 342/357.09 |
| 6,618,010 B2 | * | 9/2003 | Arndt et al. ................ 342/465 |

OTHER PUBLICATIONS

H.D. Kennedy et al., Direction Finding Antennas and Systems, in Antenna Engineering Handbook, Third Ed., edited by R.C. Johnson, 1993.*
Claims for U.S. Appl. Ser. No. 10/612,561.*

* cited by examiner

*Primary Examiner*—Thomas H. Tarcza
*Assistant Examiner*—Fred H Mull
(74) *Attorney, Agent, or Firm*—Theodore U. Ro

(57) ABSTRACT

System and methods are disclosed for passively determining the location of a moveable transmitter utilizing a pair of phase shifts at a receiver for extracting a direction vector from a receiver to the transmitter. In a preferred embodiment, a phase difference between the transmitter and receiver is extracted utilizing a noncoherent demodulator in the receiver. The receiver includes antenna array with three antenna elements, which preferably are patch antenna elements aced apart by one-half wavelength. Three receiver channels are preferably utilized for simultaneously processing the received signal from each of the three antenna elements. Multipath transmission paths for each of the three receiver channels are indexed so that comparisons of the same multipath component are made for each of the three receiver channels. The phase difference for each received signal is determined by comparing only the magnitudes of received and stored modulation signals to determine a winning modulation symbol.

10 Claims, 11 Drawing Sheets

PASSIVE TRACKING SYSTEM AND METHOD

This application is a continuation in part of U.S. patent application Ser. No. 09/994,989 filing date Nov. 14, 2001, now U.S. Pat. No. 6,618,010 B2.

ORIGIN OF THE INVENTION

The invention described herein was made by employee(s) of the United States government and may be manufactured and used by or for the Government of the United States of America for governmental purpose without payment of any royalties thereon or therefor.

BACKGROUND OF THE INVENTION

1. Field of the Invention

The present invention relates generally to signal tracking systems and, more specifically, to a passive system for tracking/locating a transmitter.

2. Background of the Invention

Determining the location and/or tracking a moveable transmitter is useful for many purposes. For instance, there frequently exists an urgent need for locating the source of an emergency 911 telephone call from a mobile phone. Previous options for this application included utilizing GPS location devices but these require additional circuitry, additional antennas, do not necessarily operate indoors, and may be slow to obtain a location fix.

Other tracking requirements might include tracking an astronaut in space during extravehicular activity. Another desirable use might be to track small vehicles in space such as, for instance, a small one-foot diameter autonomous vehicle for flying anywhere around the Space Station and transmitting video from an onboard camera.

It is also increasingly important to be able to locate, track, communicate with or activate vehicle systems wirelessly, and/or otherwise monitor fleets or individual trucks, automobiles, containers, and other moveable targets. Such monitoring is increasingly utilized and has, for instance, become a standard feature on many automobiles. Previous prior art options to perform this function typically include utilizing GPS location devices with the same problems as listed above. It would be very useful to somehow provide such monitoring in a low cost, reliable, high-speed manner that avoids/alleviates the problems associated with presently existing GPS location systems.

The above are only a few specific uses, and it will be understood that a small, inexpensive system that is capable of passively tracking a transmitter by utilizing the transmitter's data modulated signal, and which may operate in a noisy environment with mulitpath signals, may be useful for a myriad of applications and systems.

Tracking objects by receiving signals therefrom is well known. For instance, radar has been utilized for most of the last century to track objects. However radar is nonpassive, requires high power, and also requires a recognizable signature at the target for identification.

Various types of signal processing for estimation of signal parameters have been used as far back as 1795. A more recent signal processing method is that of ESPRIT (Estimation of Signal Parameters using Rotational Invariance Techniques) which is discussed in at least one of the subsequently listed patents. However, the ESPRIT technique is based on relatively complicated mathematics. The inventors believe that using the ESPRIT technique for the purposes of the present invention may require at least four antennas, the generation of complex matrices, the calculation of complex eigenvalues and eigenvectors, and the estimation of noise level. The complexity of these requirements effectively renders the ESPRIT technique unacceptable for many applications requiring low weight and power and small size.

It might also be noted that techniques exist for locating the source of a magnetic field but such techniques require a powerful-magnetic pulse generator at the source.

The following patents show attempts to solve problems related to the present invention but do not show the solution provided by the present invention:

U.S. Pat. No. 5,987,016, issued Nov. 16, 1999, to R. He, discloses a method for tracking a mobile communication signal, which operates in a code division multiple access wireless communication system including an antenna, and a base site receiver having at least two receiver tracking fingers, includes receiving at the antenna a first multipath signal arriving at an on-time pn-offset with an associated advanced pn-offset value and retard pn-offset value and receiving at the antenna a second multipath signal arriving at an on-time pn-offset with an associated advanced pn-offset value and retard pn-offset value. The method further includes determining a spacing between the first multipath signal and the second multipath signal, and adjusting the at least two receiver tracking fingers based on the advanced pn-offset value of one of the multipath signals and the retard pn-offset value of the other multipath signal.

U.S. Pat. No. 5,691,974, issued Nov. 25, 1997, to Zehavi et al., discloses a method and apparatus for tracking the frequency and phase of signals in spread spectrum communication systems that makes more efficient use of available carrier frequency and phase information by utilizing a substantial portion or all of the energy occupying the frequency spectrum of a received carrier signal, including energy from communication signals intended for other system users. Multiple spread spectrum communication signals are input in parallel to data receivers where they are despread using preselected despreading codes at an adjustable phase angle and decoded over multiple orthogonal codes active within the communication system. Multiple decoded signals are then combined to form a single phase detection signal which is used by at least one tracking loop to track frequency and phase of the carrier signal for the received communication signals. The tracking loop generates a timing signal which is used to adjust the phase angle used during despreading. In further embodiments, the communication signals are despread using appropriate PN codes and separated into in-phase (I) and quadrature channels (Q) where data symbols are processed by fast Hadamard transformers to generate corresponding data bits. The data is formed into pairwise products between the channels and summed over multiple or all active subscriber orthogonal codes. This sum indicates a degree to which the estimated phase differs from the actual phase of received communication signals and is used to adjust the phase of application for the PN codes.

U.S. Pat. No. 5,621,752, issued Apr. 15, 1997, to Antonio et al., discloses a system and method for adaptively sectorizing channel resources within a digital cellular communication system is disclosed herein. The system includes an antenna arrangement for providing at least first and second electromagnetic beams for receiving a first information signal transmitted by a specific one of a plurality of users, thereby generating first and second received signals. A first set of beam-forming signals are then generated from the first and second received signals. A demodulating receiver is provided for demodulating at least first and second beam-forming signals included within the first set of beam-forming signals, thereby producing first and second demodulated signals. The system further includes a tracking network for tracking multipath information signals, received from various positions and angles of incidence, based on comparison of the first and second demodulated signals.

U.S. Pat. No. 6,147,641, issued Nov. 14, 2000, to J. Issler, discloses a process for the autonomous reduction of acquisition and tracking thresholds of carriers received in orbit by a receiver accessing an orbital navigator inside or outside said receiver, the latter having at least one phase loop. The phase loop, which is responsible for the acquisition and/or tracking of the carrier, is "pushed" by the fine speed aid and takes up the error between the real speed and the calculated speed. The search for the Doppler frequency of the carrier received takes place around a frequency prediction maintained by the fine speed aid coming from the orbital navigator.

U.S. Pat. No. 5,914,949, issued Jun. 22, 1999, to G. Y. Li, discloses a finger tracking circuit for a rake receiver, a method of tracking a carrier signal and a wireless infrastructure. The finger tracking circuit includes: (1) a timing error subcircuit that determines a timing error in a current power control group ("PCG") of a carrier signal to be tracked and (2) a feedback subcircuit that applies a gain signal that is a function of a data rate of the carrier signal and a signal-to-noise ratio ("SNR") to the timing error subcircuit, a convergence rate of the finger tracking circuit therefore depending on the data rate of the carrier signal.

U.S. Pat. No. 5,859,612, issued Jan. 12, 1999, to K. S. Gilhousen, discloses a method for determining the position of a mobile station within a cellular telephone system having a plurality of base stations. A signal is transmitted from a rotating antenna. The rotating antenna has a beam which rotates around a cell in the cellular telephone system. The beam has a rotational timing that is known by the mobile station. The signal is received at the mobile station. Based on a reception time when the signal is received by the mobile station, an angular displacement value corresponding to the position of the mobile station is determined. A first round trip signal propagation time between a stationary antenna and the mobile station is measured using a voice information signal. The position of the mobile station is determined in accordance with the angular displacement value and the first round trip signal propagation time. A method for determining the position of a mobile station within a cellular telephone system having a plurality of base stations. A voice information signal is transmitted from the mobile station. The voice information signal is received with a first antenna having a rotating beam for receiving the signal. Based on a reception time when the voice information signal is received by the first antenna, an angular displacement value corresponding to the position of the mobile station is determined. A first round trip signal propagation time between a second antenna and the mobile station is measured. The position of the mobile station is determined in accordance with the angular displacement value and the first round trip signal propagation time.

U.S. Pat. No. 5,602,833, issued Feb. 11, 1997, to E. Zehavi, discloses a method and apparatus for generating orthogonally encoded communication signals for communication system subscribers using multiple orthogonal functions for each orthogonal communication channel. Digital data symbols for signal recipients are M-ary modulated using at least two n-length orthogonal modulation symbols, which are generally Walsh functions normally used within the communication system. These symbols are provided by a modulation symbol selector typically from one or more code generators, and the modulation is such that M equals a product of a total number of orthogonal functions and the number used to generate individual modulation symbols. Each group of log M encoded data symbols from data processing elements are mapped into one modulation symbol using the modulation symbol selection element according to their binary values. In some embodiments, a fast Hadamard transformer is used for symbol mapping. The resulting communication signals are demodulated by correlating them with the preselected number of orthogonal functions, in parallel, and demodulating the results into M energy values representing each orthogonal modulation symbol. The energy values are mapped into energy metric data using a dual maximum metric generation process. The correlation and demodulation can be accomplished using at least two sets of N correlators, N being the number of functions used, and applying correlated signals to one demodulator for each set of correlators. Each demodulator outputs M energy values representing each of the M mutually orthogonal modulation symbols, which are then combined into a single set of M energy values. In further configurations, coherent demodulators can be used to produce amplitude values for received signals which are then combined with dual maximum metric results to produce composite metric values for data symbols.

U.S. Pat. No. 4,750,147, issued Jun. 7, 1988, to Roy, III, et al., discloses an invention relating generally to the field of signal processing for signal reception and parameter estimation. The invention has many applications such as frequency estimation and filtering, and array data processing, etc. For convenience, only applications of this invention to sensor array processing are described herein. The array processing problem (addressed is that of signal parameter and waveform estimation utilizing data collected by an array of sensors. Unique to this invention is that the sensor array geometry and individual sensor characteristics need not be known. Also, the invention provides substantial advantages in computations and storage over prior methods. However, the sensors must occur in pairs such that the paired elements are identical except for a displacement which is the same for all pairs. These element pairs define two subarrays which are identical except for a fixed known displacement. The signals must also have a particular structure which in direction-of-arrival estimation applications manifests itself in the requirement that the wavefronts impinging on the sensor array be planar. Once the number of signals and their parameters are estimated, the array configuration can be determined and the signals individually extracted. The invention is applicable in the context of array data processing to a number of areas including cellular mobile communications, space antennas, sonobuoys, towed arrays of acoustic sensors, and structural analysis.

The above prior art does not disclose a system that uses a herein disclosed technique in one preferred embodiment for extracting a direction vector from a pair of phase shifts. Moreover, the prior art does not disclose the herein disclosed technique for extracting the phase difference between a transmitter and receiver, which in one preferred embodiment may provide a noncoherent demodulation scheme, and then using the phase difference to detect the location of the transmitter.

Therefore, those skilled in the art have long sought and will appreciate the present invention that addresses these and other problems.

SUMMARY OF THE INVENTION

An object of the present invention is to provide an improved transmitter tracking system and method.

Yet another object of the present invention is to provide an improved system and method for locating and/or tracking the transmitter of a data-modulated electromagnetic signal that is operable in the presence of noise and/or multipath interference.

One of many advantages of the present invention is that the system does not require a coherent reference at the receiver.

One of many features of a preferred embodiment of the present invention is a novel technique for extracting the relative phase difference between a transmitter and a receiver.

Another of many features of a preferred embodiment of the present invention is that the system and method may convert the phase difference between a transmitter and receiver into a unit direction vector.

An advantage of the present invention is an inexpensive, quickly operating system that can be utilized with any communication system for locating a moveable transmitter.

These and other objects, features, and advantages of the present invention will become apparent from the drawings, the descriptions given herein, and the appended claims. It will be understood that above listed objects, features, and advantages of the invention are intended only as an aid in understanding aspects of the invention, are not intended to limit the invention in any way, and do not form a comprehensive list of such objects, features, and advantages.

Therefore, the present invention comprises a passive system for locating a transmitter comprising one or more elements, such as for instance, at least one antenna array comprising a first antenna element, a second antenna element and a third antenna element. The first antenna element is operable for receiving a first received signal from the transmitter, the second antenna element is operable for receiving a second received signal from the transmitter, and the third antenna is operable for receiving a third signal from the transmitter. Other elements may include electronic circuitry to determine a first phase difference between the first received signal and the second received signal as well as a second phase difference between the first received signal and the third received signal. The electronic circuitry is preferably operable for determining an orientation of a vector from the antenna array to the transmitter by utilizing the first phase difference and the second phase difference.

In a preferred embodiment, the second antenna element and the third antenna element may be spaced apart from the first antenna element by one-half wavelength or integer multiple thereof. A preferred embodiment antenna array comprises only three antenna elements consisting of the first antenna element, the second antenna element, and the third antenna element. A geometrical configuration is provided for the first antenna element, the second antenna element, and the third antenna element such that a first leg between the first antenna element and the second antenna element and a second leg between the first antenna element and the third antenna element have a first angle therebetween less than one hundred eighty degrees. Preferably, the first angle is ninety degrees for efficient operation. Preferably, the first antenna element, the second antenna element, and the third antenna element each comprise a microstrip patch antenna.

The electronic circuitry may further comprise a local oscillator operating at the same frequency as the transmitter but not phase locked with respect to the transmitter frequency. The electronic circuitry may further comprise a spread spectrum receiver with a first receiver channel for processing the first received signal from the first antenna element, a second receiver channel for processing the second received signal from the second antenna element, and a third receiver channel for processing the third received signal from the third antenna element. Additional electronic circuitry may include a first downconverter for the first receiver channel, a second downconverter for the second receiver channel, and a third downconverter for the third receiver channel. Furthermore, thee electronic circuitry may comprise a first finger for the first receiver channel, a second finger for the second receiver channel, and a third finger for the third receiver channel. In a preferred embodiment, each of the first finger, the second finger, and the third finger are operable for performing a Fast Walsh Transform to determine a winning Walsh symbol based on magnitude and not phase of a Walsh vector.

In accord with a preferred embodiment of the invention, a method is provided for passively detecting the location of the transmitter wherein the transmitter emits a signal of a known frequency and known modulation scheme comprising one or more steps, such as for instance, receiving the transmitter signal, with a first antenna array comprising a first antenna element that produces a first received signal, a second antenna element that produces a second received signal, and a third antenna element that produces a third received antenna signal. Other steps may include determining a first phase difference between the first received signal and the second received signal, determining a second phase difference between the first received signal and the third received signal, and utilizing the first phase difference and the second phase difference to determine a first vector in the direction of the transmitter from the first antenna, array.

In one embodiment, the method may include receiving the transmitter signal of a known frequency and known modulation scheme with a second antenna array spaced from the first antenna array, the second antenna array comprising one or more elements, such as for instance, a fourth antenna element that produces a fourth received signal, a fifth antenna element that produces a fifth received signal, and a sixth antenna element that produces a sixth received antenna signal, determining a third phase difference between the fourth received signal and the fifth received signal, determining a fourth phase difference between the fourth received signal and the sixth received signal, and utilizing the third phase difference and the fourth phase difference to determine a second vector in the direction of the transmitter from the second antenna array. Additional steps may further comprise utilizing the first vector and the second vector for locating the transmitter.

The method may also comprise providing a local oscillator with the same frequency as the transmitter frequency but not phase locked with respect to the transmitter frequency and/or processing the first received signal, the second received signal, and the third received signal in a spread spectrum receiver. The spread spectrum receiver may perform steps such as downconverting and despreading the first received signal, the second received signal and the third received signal.

In a preferred embodiment for use with multipath noise, the method may comprise tracking multiple transmitter paths of the first received signal, the second received signal, and the third received signal. The tracking may comprise separately time multiplexing the multiple transmitter paths for each of the first received signal, the second received signal, and the third received signal. Other steps may comprise indexing multipath components for the first received signal, the second received signal, and the third received signal with respect to a position of each of the multipath components with respect to a generated local PN sequence. Preferably the method includes steps such as comparing an indexed multipath signal of the first received signal to a corresponding indexed multipath signal of the second received signal and the third received signal to produce a multipath comparison and/or utilizing the multipath comparison to determine the first phase difference and the second phase difference.

Operational steps may include storing a plurality of modulation symbols, performing a Fast Walsh Transform on the plurality of modulation symbols to determine a winning symbol, comparing the winning signal to the plurality of symbols to determine a signal to noise ratio, and utilizing the signal to noise ratio to determine whether a local PN-generator is aligned with the transmitted signal.

In other words, the method may comprise providing a noncoherent receiver whereby a local oscillator has a frequency equal to the transmitter frequency but not phase locked with respect to the transmitter frequency, determining a phase difference between the transmitter and the noncoherent receiver, and utilizing the first phase difference to produce a vector which points in the direction of the transmitter.

In a preferred embodiment the method comprises steps such as providing that the receiver is a spread spectrum receiver operable for orthogonal symbol modulation, detecting bits at any arbitrary angle between the transmitter and receiver, obtaining a plurality of modulation symbols, and selecting a winning modulation symbol from the plurality of modulation symbols based solely on magnitude related to the winning modulation symbol. Further steps may include utilizing a phase related to the winning modulation symbol to represent a phase difference between the transmitter and the noncoherent receiver such as the a phase difference related to the first, second, or third received signals.

Restated, the method may comprise steps such as receiving a plurality of modulation symbols with a receiver, determining a magnitude and phase for each of the modulation symbols, comparing the plurality of modulation symbols with respect to their magnitudes to determine a winning modulation symbol from the plurality of modulation symbols and utilizing a phase of winning symbol for representing a relative phase between the transmitter and the receiver.

Additional steps may comprise producing a local PN code signal which corresponds to the transmitted PN code signal of the transmitter, producing a floor from the magnitudes of the plurality of modulation symbols, comparing the floor with a magnitude of the winning symbol to produce a value related to signal to noise, and utilizing the value to determine if the local PN signal is aligned with the transmitted PN code signal of the transmitter. If the value is outside of a desired range, then the method may include one or more steps of shifting the local PN signal. If the value is within a desired range, then the method may comprise utilizing the phase of the winning symbol to determine early and late modulation symbols. The method may further comprise comparing the early and late modulation symbols to previously stored early and late modulation signals.

The present invention also comprises a method for determining a phase between a spread spectrum transmitter and spread spectrum receiver comprising one or more steps, such as for instance, receiving a plurality of modulation symbols with the receiver, determining a magnitude and phase for each of the modulation symbols, comparing the plurality of modulation symbols with respect to the magnitude to determine a winning modulation symbol from the plurality of modulation symbols, and utilizing a phase of winning symbol for representing a relative phase between the transmitter and the receiver.

A method for a passive system in accord with the present invention may be provided for determining location characteristics of a plurality of moveable transmitters, wherein each of the plurality of moveable transmitters preferably produces a transmitter signal of a known frequency and known modulation scheme, comprising steps such as providing a plurality of receivers spaced apart wherein each of the plurality of moveable transmitters is receivable by at least one of the plurality of receivers, providing each receiver with an antenna array preferably with three spaced apart antenna elements, determining a pair of transmitter signal phase shifts at the three spaced apart antenna elements for a respective first moveable transmitter and first receiver, and utilizing the pair of transmitter signal phase shifts to determine a first direction of the first moveable transmitter with respect to the first receiver.

In one operational mode the method comprises utilizing a receiver generated PN signal to determine a distance from the first receiver to the first moveable transmitter, and utilizing the distance and the first direction to determine a position of the first moveable transmitter.

In another operational mode, the method comprises determining a second pair of transmitter signal phase shifts at a second of the three spaced apart antenna elements for the respective first moveable transmitter and a second receiver, utilizing the second pair of transmitter signal phase shifts to determine a second direction of the first moveable transmitter with respect to the second receiver, and utilizing the first direction and the second direction to determine a position of the first moveable transmitter.

In another operation mode, the method comprises obtaining a possible path of travel of the first moveable transmitter, and utilizing the first direction and the possible path of travel for determining a position of the first moveable transmitter.

Other steps may include displaying a position of one or more of the plurality of moveable transmitters on a map and/or displaying the map in a vehicle to which the moveable transmitter is affixed.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DESCRIPTION OF PREFERRED EMBODIMENTS

The present invention provides a quickly operating, inexpensive, system and method for locating a transmitter in 3-D space (in x, y, and z). Location times may typically be determined real time (less than one second). The accuracy of location is comparable to that of GPS location systems and is typically at least within tens of feet but may potentially be considerably more precise depending on the particular mode of operation as discussed hereinafter. In a preferred embodiment, the transmitter may be a standard communications transmitter, such as a cell phone or other communications transmitter, and it is desired to determine the location thereof. Thus, the transmitter sends a standard data-modulated signal of a known frequency and known modulation scheme, which could be any type of communications signal. An advantage of the present invention is that a special distress signal is not required for operation of the invention so that the present invention can simply be used as an inexpensive, add-on feature to any communications system. However, the invention would also be operable for locating the transmitter if a special distress signal were to be used. Therefore, in a preferred embodiment, a small-sized, quick operating, low cost device in accord with the present invention may be added on to already existing communication systems, such as cellular telephone networks, to provide quick, accurate, and inexpensive location information.

Figure 1:
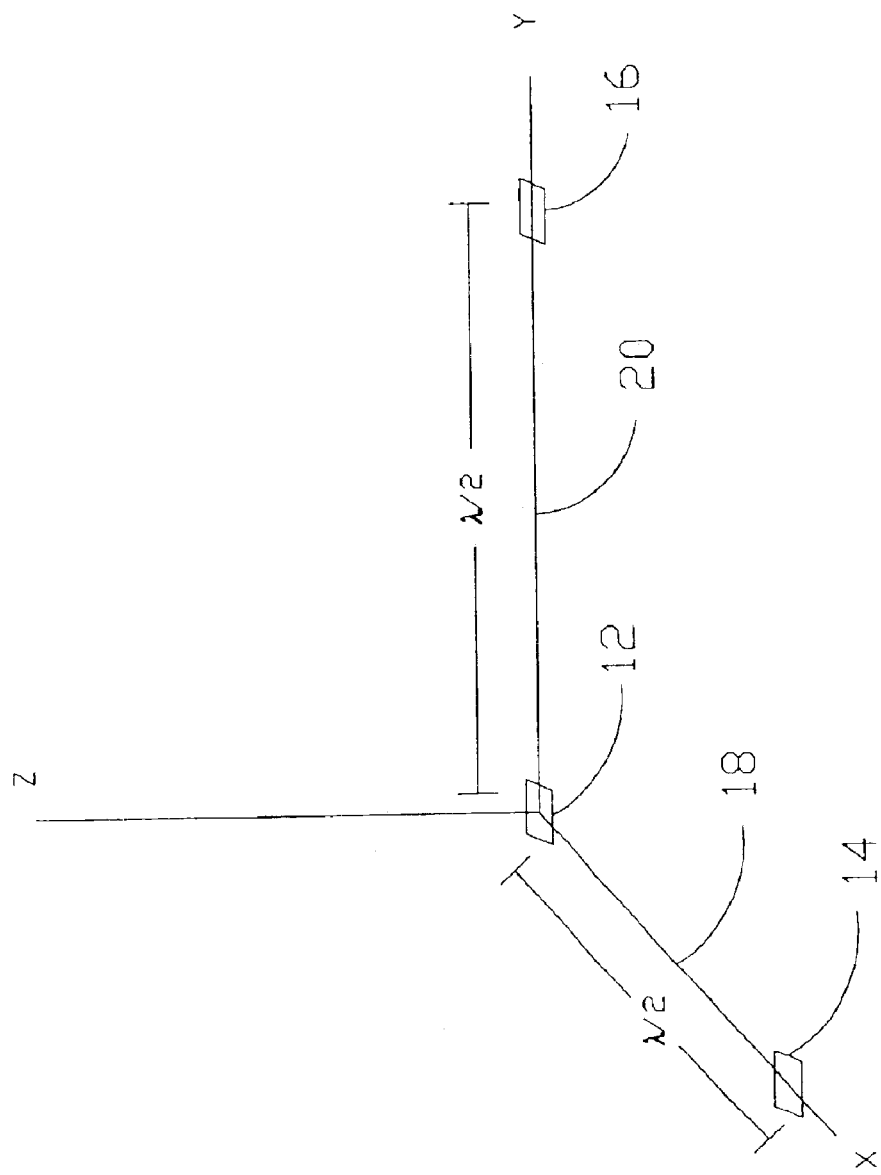
FIG. 1 is a schematic for a three element microstrip patch antenna within a coordinate system in accord with the present invention.

Referring now to the drawings, and more specifically to FIG. 1, is a receiver antenna in accord with a presently preferred embodiment of the invention comprising three-element array 10 of microstrip patch antenna elements 12, 14, and 16. While other types of omni-directional antenna elements could also be utilized to form three-element array 10, in a preferred embodiment patch antennas 12, 14, and 16 are utilized. Patch antennas 12, 14, and 16 are preferably arranged in the geometry of a right triangle as indicated in FIG. 1. Actually, any angle between antenna elements 12, 14, and 16 could be utilized but the ninety degree spacing, with right hand triangle geometry, is considered optimal in terms of accurately determining any vector direction in accord with the preferred method of operation as discussed hereinafter. Legs or spacings 18 and 20 between the antenna elements are preferably of a length equal to one-half the carrier wavelength λ. With respect to the preferred embodiment of operation, if the length between antenna elements is greater than one-half wavelength, then there may be phase ambiguities when the preferred embodiment measurements are made in the manner discussed in some detail below. If the length is less than one-half wavelength, there are no 2 pi phase ambiguities but the directional accuracy may be reduced when using the preferred embodiment operation. The size of microstrip patch antenna elements 12, 14, and 16 should be less than one-half the electrical wavelength in the preferred embodiment. As one example of physical size, cellular frequencies are in the 1 GHz frequency range which corresponds to a 30 cm wavelength. Thus, the spatial separation between the antenna elements 12, 14, and 16 is preferably less than 15 cm for such operation. The size of the microstrip patch antenna can be further reduced by increasing the dielectric constant of the material. Thus, elements 12, 14, and 16 are suitably electrically insulated with respect to each other.

Using the corner element 12 as a reference, a receiver in accord with the present invention computes the transmitter signal phase differences $\Phi_1$ and $\Phi_2$ between reference element 12 and each of the other two elements 14 and 16. Each phase difference is equal to the product of the wavenumber $k=2\pi/\lambda$ and the difference in distance that the transmitter signal travels to reference 12 as compared with that of each element 14 and 16.

In rectangular coordinates as indicated in FIG. 1, with reference 12 located at the origin and with elements 14 and 16 aligned with the x and y axes, respectively, this phase difference is given by the projection of the leg of the triangle (which may be horizontal or vertical with respect to an Earth oriented system) with a unit vector in the direction of the transmitter. While the coordinate system orientation may vary depending on the application, for operation on the Earth, the antenna array may be oriented, for example only, whereby element 14 is horizontally positioned with respect to reference element 12 and element 16 is vertically positioned.

Figure 3:
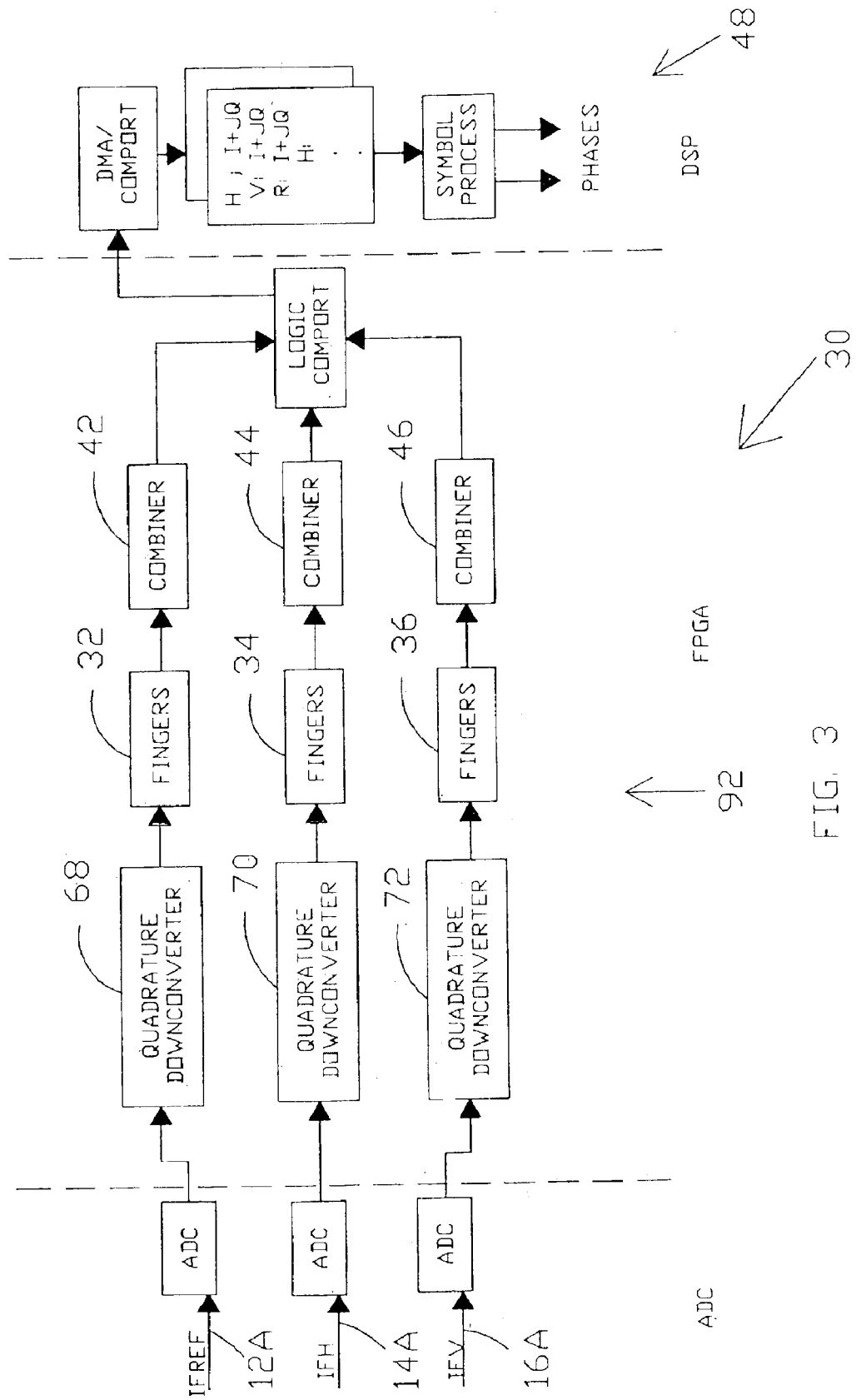
FIG. 3 is a block diagram for a presently preferred spread-spectrum receiver in accord with the present invention.

Each antenna element 12, 14, and 16 produces a received signal which may be initially processed in three separate receiver channels indicated in FIG. 3 as 12A, 14A, and 16A, where a particular embodiment of a receiver utilizing a spread spectrum receiver is shown.

Figure 2:
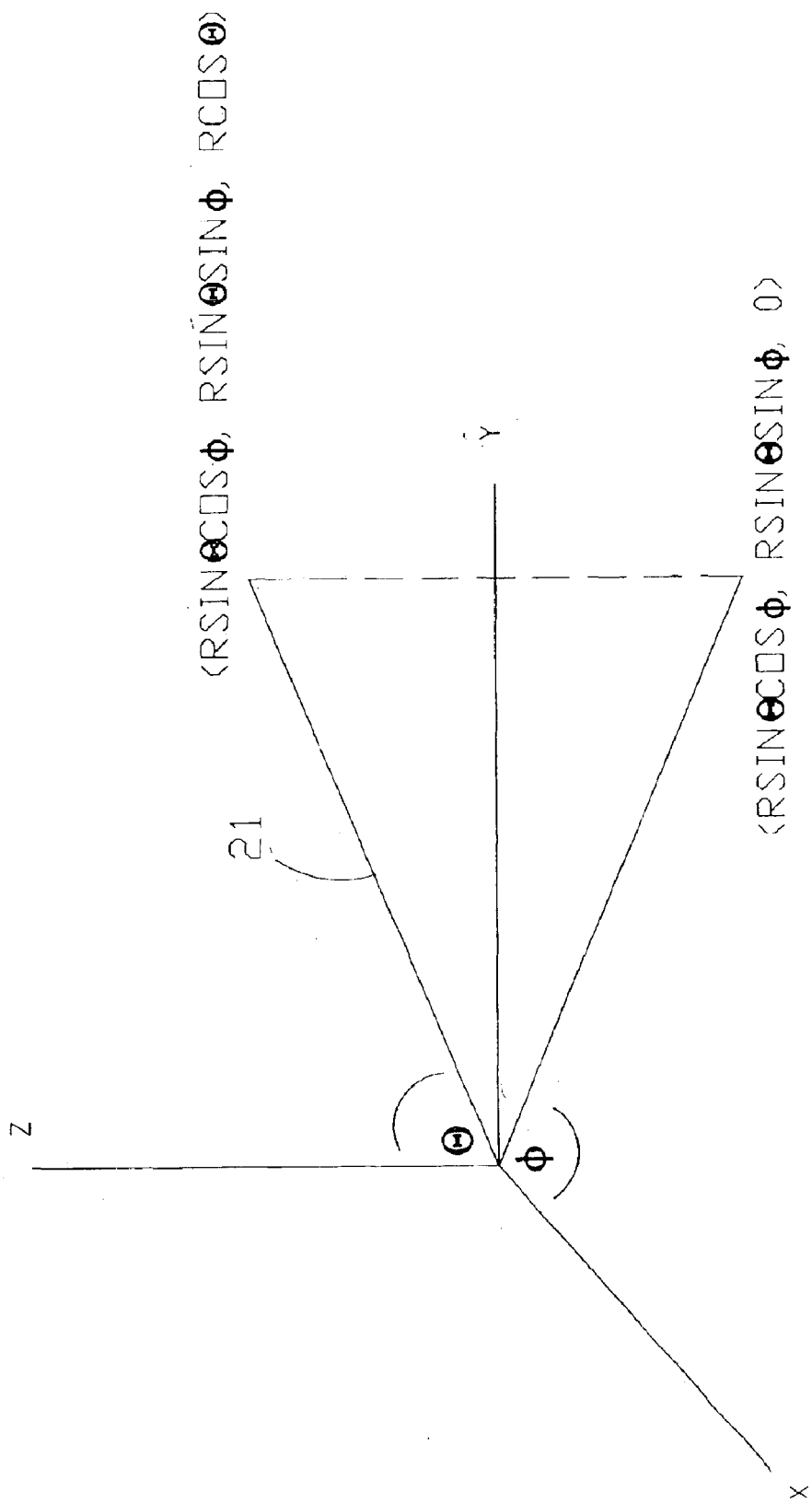
FIG. 2 is a schematic showing a spherical coordinate system with direction angles to a transmitter in accord with the present invention.

Expressing the unit vector in spherical coordinates as shown in FIG. 2, one obtains the phase differences:

$\Phi_1 = \pi \sin\theta \cos\phi$
$\Phi_2 = \pi \sin\theta \sin\phi$ for the phase shifts. Inversion of these equations yields $$\phi = \arctan\left(\frac{\Phi_2}{\Phi_1}\right) \quad \theta = \arcsin\left(\frac{\sqrt{\Phi_1^2 + \Phi_2^2}}{\pi}\right)$$

for the angles which determine the direction to the transmitter as indicated by vector 21.

In one embodiment utilizing two antenna arrays, such as antenna array configuration 10 shown in FIG. 1, and assuming two such receivers are spaced a known distance apart, the distance from the transmitter to receiver can be determined by intersection of the two direction vectors 21 produced by the two receivers. With only one receiver, the distance along one direction vector can be recovered using the time the signal travels from transmitter to receiver, as discussed below, to thereby pinpoint the transmitter. The method for extracting the transmitter position from phase differences at the receiver is applicable in a wide variety of baseband coding and modulation formats. Moreover, while various techniques may theoretically be utilized to determine the received signal phase differences at elements 12, 14, and 16, a preferred technique is discussed below that is considered especially convenient, small, inexpensive and, moreover, operates accurately in a noisy environment that includes multipath signals. A preferred embodiment for operation of the present invention provides for extracting at least one direction vector from a pair of phase shifts, and possibly another direction vector from another pair of phase shifts at a second receiver. Thus, while the preferred method for extracting the phase shift, which operates in noisy environments and with multipath noise, is discussed hereinafter it will be understood that other means could also be utilized for extracting the phase shifts.

In one particular embodiment of the invention for a particular known modulation scheme, the baseband data is orthogonally coded and then spread into two channels using two independent PN (pseudo noise) codes. In this example, the data in these channels QPSK (quaternary phase shift keying) modulates an RF (radio frequency) signal or carrier at an RF frequency. Other types of modulation schemes could also be used, some of which are mentioned hereinafter.

The choice of orthogonal symbol modulation scheme requires a few words of justification, since both the transmitter and receiver may seem more complex than a simple direct-spread antipodal symbol modulation scheme.

The objectives of rapid acquisition (robust operation in burst scenarios) and robust performance in the presence of multipath interference has made a noncoherent demodulator attractive. The noncoherent demodulator does not have to align the phase of the local carrier to the phase of the transmitter. Instead, the noncoherent modulator's task is only to align the phase of the transmitter's PN code generators.

Note that the present invention could also utilize a coherent demodulator if desired so that a noncoherent demodulator is not a requirement but simply a presently preferred embodiment. However, the coherent demodulator (in a pilotless system) must employ a carrier tracking loop that must be phase locked before the information bits can be detected. This process adds acquisition time that is normally acceptable only in a constant wave scenario. In the presence of multipath signals, if the multipath signal components are to be recovered, a separate carrier tracking loop would be required for each multipath component. This adds substantial complexity to the hardware.

A demodulator in accord with one preferred embodiment of the invention avoids this complexity by using fingers 32, 34, 36 and combiners 42, 44, and 46 as indicated in the block diagram of FIG. 3 for one embodiment of spread spectrum receiver 30. Finger 40 as indicated in some detail in the block diagram of FIG. 4, corresponds to each of fingers 32, 34, and 36. Finger 40, in a preferred embodiment, is a time-multiplexed block that allows the same physical hardware (at the expense of memory) to track multiple transmitter paths. Finger 40 manages it own spreading sequence timing, multipath acquisition and tracking, performs the despreading, and maximum-likelihood orthogonal symbol detection. The combiner, such as combiners 42, 44, and 46, provides the appropriate delay to align the symbols from each finger for addition and phase determination which may preferably be performed within digital signal processor portion 48 of spread spectrum receiver 30.

The presently preferred mechanism by which the bits can be detected at any arbitrary angle between the transmitter and receiver is the orthogonal symbol modulation. The orthogonal symbol chosen is the Hadamard-Walsh pattern. The 64 modulation symbols are correlated with every possible (64) orthogonal symbol individually on I and Q from the quadrature sampling demodulator. The result is 64 Walsh vectors in rectangular coordinates. The magnitude of each symbol vector is computed. These 64 magnitudes are added to each of the 64 magnitudes from all the other locked fingers. The index of the largest magnitude is determined to be the transmitted symbol. It is an advantage of the present embodiment that the phase of the vector does not matter. Instead, detection in accord with a preferred embodiment is based solely on magnitude.

Phase determination, however, does utilize this phase information. The angle represented by the winning symbol vector represents the relative phase between the transmitter and receiver. Again, the multipath components are utilized. Unlike the magnitude detection that combined all multipath signals' magnitude, each multipath signal's angle must be processed separately. This is because each of the multipath components in each receive path, 12A, 14A, and 16A, will have an arbitrary angle to the local carrier and, consequently, can't be combined into a single angle for that receive path. Indexing each multipath component by its position relative to the local PN sequence generators allows identification of that multipath component. Each multipath signal in the reference leg 12A, then, can be compared to the same multipath signal in each of the horizontal 14A and vertical legs 16A. The results of these individual multipath comparisons are finally combined to yield a single angle for each of the horizontal and vertical legs as discussed subsequently with respect to a preferred noncoherent digital quadrature sampling demodulator.

Substantial reduction in hardware complexity is achieved by sampling at one quarter intervals of the intermediate frequency (F) signal. A 90° phase shift in the local oscillator is accomplished by a delay of one sample. As described in detail below, down-conversion from IF to baseband requires multiplication by only $\{\pm I, \pm i\}$, which, in turn, requires only rearrangement of samples.

Figure 4:
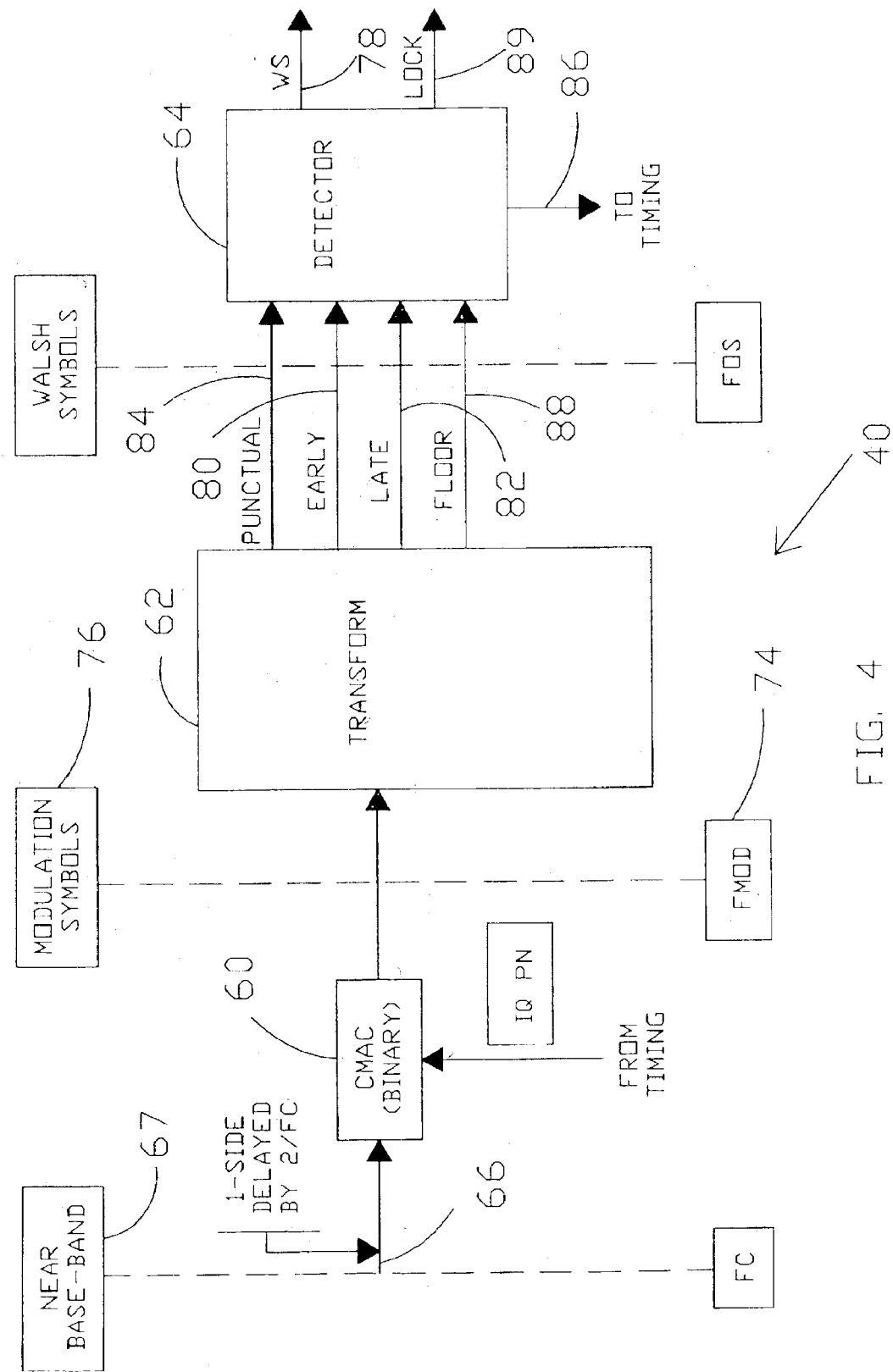
FIG. 4 is a block diagram for a presently preferred more detailed implementation of the finger sections shown FIG. 3.

Each of the fingers, such as finger 40, provides a noncoherent demodulator for the Walsh orthogonal modulated symbols. The optimum noncoherent demodulator for (Hadmard-) Walsh M-ary orthogonal modulation is a bank of M orthogonal noncoherent correlators. For the single path, the demodulator makes its decision by selecting the largest magnitude as corresponding to the sequence most likely to have been transmitted. For the multipath case, the optimum decision requires adding the individual noncoherent correlator outputs for each of the independent paths before a decision is made. The finger is made up of binary CMAC (Complex Multiply Accumulator) block 60, transform block 62, and detector block 64. The near baseband signal, as indicated at 66 in FIG. 3, which comes from a respective one of quadrature downconverters 68, 70, or 72 shown in FIG. 4, is despread by the complex correlation with CMAC block 60. The resulting chip symbols are accumulated over the modulation symbol period, Fmod as indicated by labels 74 and 76 within the flow path of finger 40. The resulting modulation symbols are maximum likelihood detected with a complex Fast Walsh Transform (FWT) in transform block 62. With the winning symbol 78 detected, the early and late samples 80 and 82, respectively, of the modulation symbols are correlated with the known Walsh pattern to generate early and late correlation signals. The punctual 84 (winning on-time), early 80, and late signals 82 are sent to detector block 64. Detector block 64, as shown in more detail in FIG. 5, computes and filters a timing discriminator signal 86 that controls the finger timing in two states: acquisition and tracking. The state is chosen based upon a lock detection, lock signal 88, computed by a (noise) floor estimate from transform module 62.

Transform block 62 is the heart of the demodulator. The transform preferably refers to the Fast Walsh Transform (FWT) performed to detect one of 64 possible Walsh symbols. The result of the FWT is a soft Walsh symbol in rectangular coordinates, the index of the winning Walsh symbol, and the mean magnitude of all the losing Walsh symbols (the 'floor'). The index of the winning Walsh symbol is the most likely 6 information bits transmitted. The confidence of that decision is the magnitude of the Walsh vector. The angle of the transmission relative to the receiver's local carrier is the angle of the Walsh vector. The signal to noise of the symbol is the magnitude ratio of the winning Walsh symbol to the floor as determined at 90 in FIG. 5 and is used for lock detection. The following list describes the order of events occurring in transform block 62 of FIG. 4:

Every 1/Fmod seconds, a new modulation-symbol is recorded in onboard ram (within the FPGA 92 (field programmable gate array integrated circuit). FPGA 92 is indicated as the center section of receiver 30 in FIG. 3 and may preferably be implemented as a single integrated circuit that is programmed in the desired configuration. Three modulation symbols exist: early 80, punctual 84, and late 82.

Once 64 Walsh-symbol-aligned samples have been collected, the complex FWT is executed. The symbol alignment is known from the state of the PN-generators.

Figure 5:
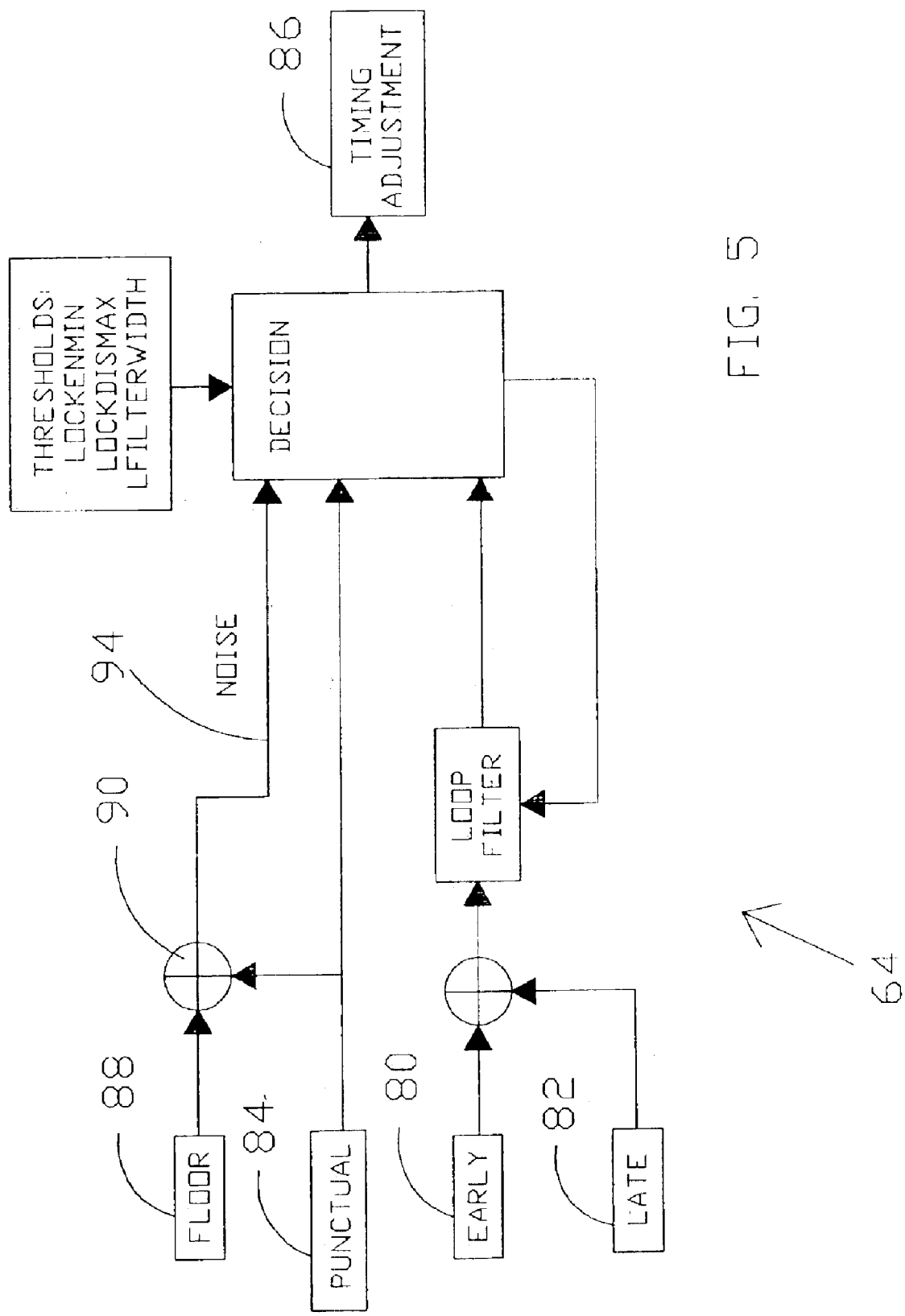
FIG. 5 is a block diagram for a presently preferred detector section shown in FIG. 4 in accord with the present invention.

In the course of computing the FWT, a magnitude estimation is made by combining the magnitude of the 64 possible symbols to produce floor 88. This combined magnitude or floor 88 minus the magnitude of the winner 78, as indicated at 90 in FIG. 5, is the magnitude of noise 94 (in the same units as the winning symbol magnitude). Floor 88 yields information useful for lock detection. If the ratio of punctual 84 to floor 88 is below a threshold, either the SNR is too low for demodulation or the local PN-generators are not aligned with the transmitted signal (i.e. not in lock . . . keep searching, don't pass off the resulting bits as valid, and don't compute the angle).

Once the complex FWT is completed and the Walsh symbol decision is made, that symbol is used to post process the early and late samples. The known 64-bit Walsh pattern is correlated (in Walsh correlator, WC) to the stored early and late samples yielding timing error direction information (in tracking state).

The FWT is analogous to the fast Fourier transform; a high degree of redundancy of execution can be optimized away, and, the basic operation is the butterfly. The intention is to correlate 64 samples with each of the 64 possible Walsh symbols and to choose the largest. The method requires $n2^n$ cycles and has a significant advantage over the implementation which takes $2^{2n}$, where n=6 in this case.

The above overview describes general operation of a preferred embodiment of the present invention and the following provides a more detailed analysis of mathematical theory underlying the operation of an embodiment of the present invention.

Figure 6:
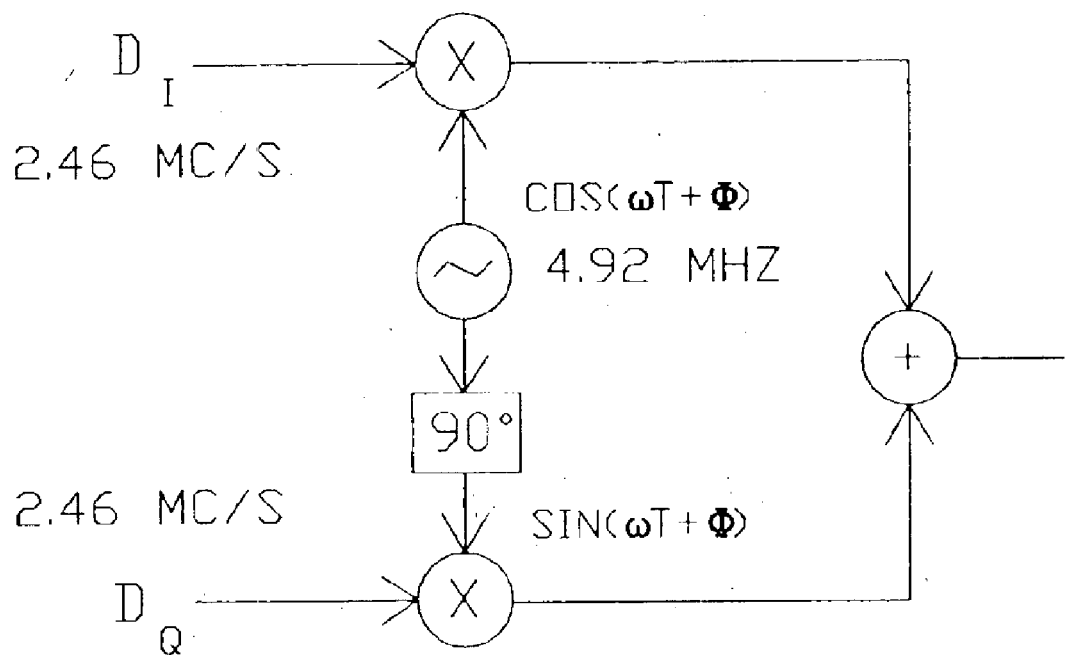
FIG. 6 is a block diagram illustrating the use of a QPSK modulation scheme that may be utilized in accord with the present invention.
Figure 7:
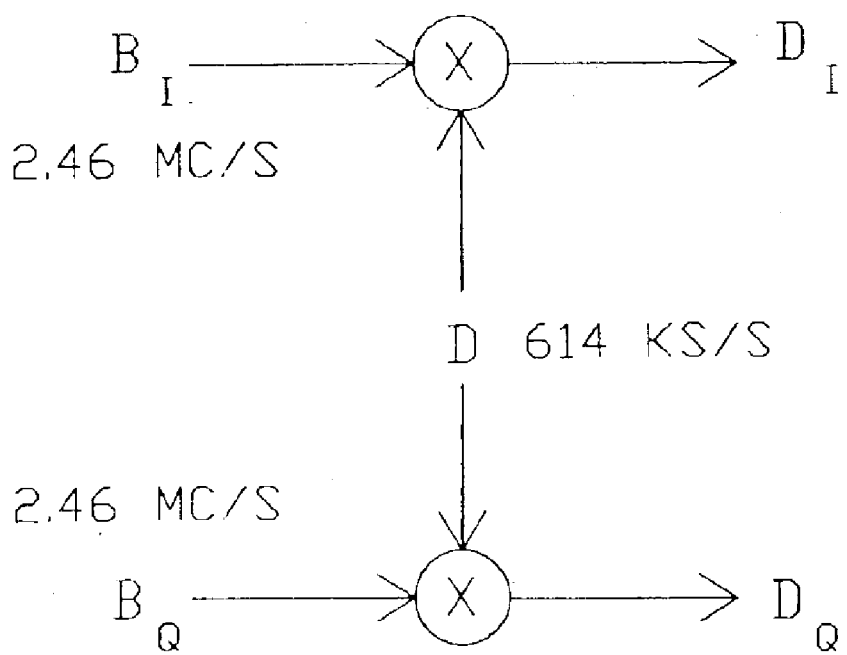
FIG. 7 is a block diagram illustrating a baseband coding scheme that may be utilized in accord with the present invention.

Referring to FIG. 6 for QPSK modulation and FIG. 7 for baseband coding, respectively, let I represent the received QPSK-modulated signal.

$$I = d_I \cos(wt+\Phi) + d_Q \sin(wt+\Phi)$$

where:

$d_I = d\ b_I$ and $d_Q = d\ b_Q$ are the in-phase and quadrature modulation symbols, d is the modulation symbol (Walsh-modulated information bit), $b_I$ and $b_Q$ are the in-phase and quadrature code bits, $w = 2\pi f$ is the angular frequency for the intermediate frequency (IF)f, and φ is the unknown phase difference between transmitter and receiver.

Figure 8:
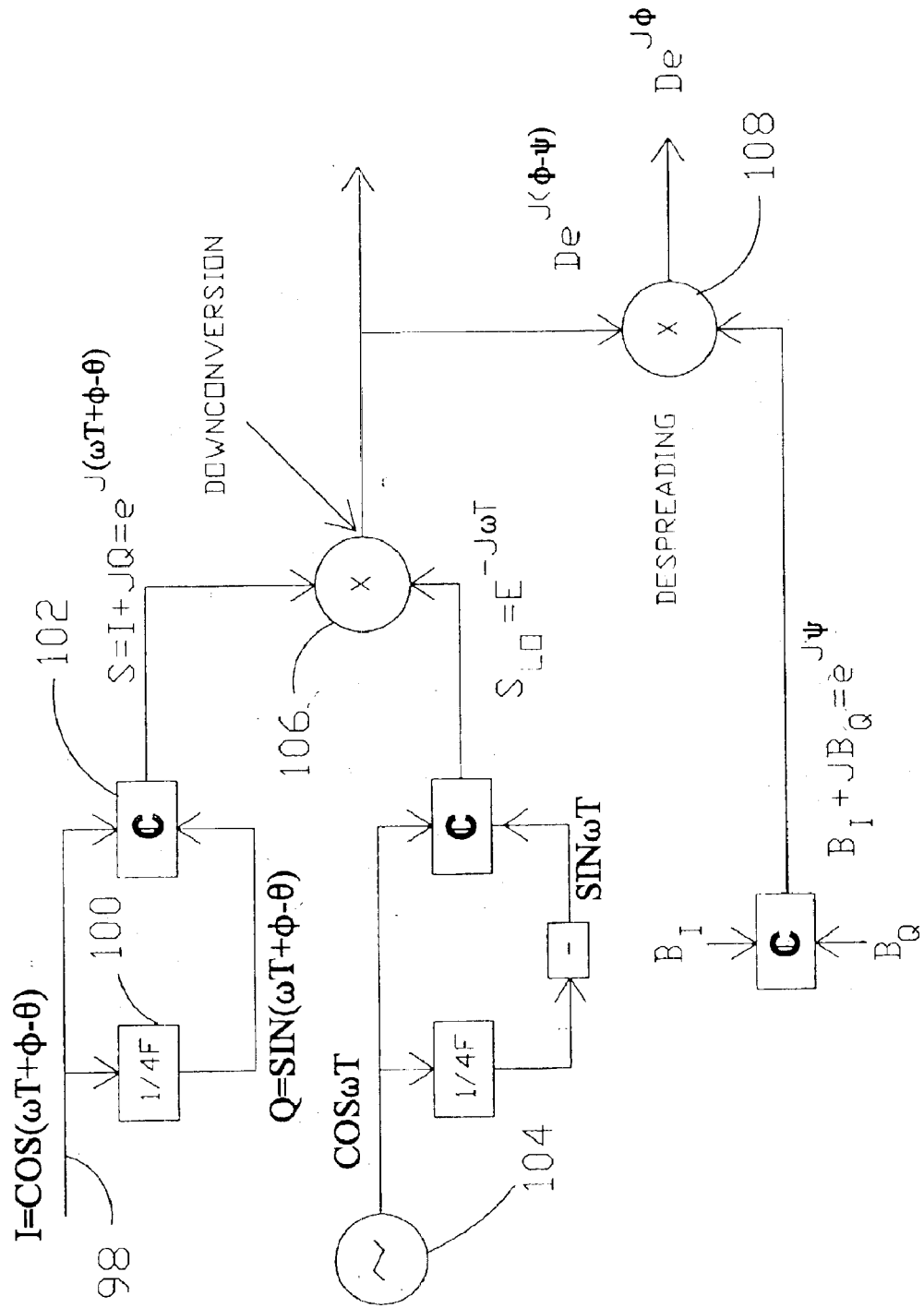
FIG. 8 is a block diagram illustrating a downconversion and despreading scheme that may be utilized in accord with the present invention.

The received quadrature signal Q is formed from I by a one-quarter period time delay 100 in FIG. 8, i.e., $$Q(t) = I\left(t - \frac{1}{4f}\right)$$

$$Q = d_I \sin(wt+\phi) - d_Q \cos(wt+\phi).$$

Let s=I+jQ be the complex representation of the received signal which is the output of complexifier 102, i.e., inputs a+b to complexifier 102 produce an output a+jb. Since d, $b_I$, $b_Q$, and hence, $d_I$ and $d_Q$ all belong to the set {−1,1}, $$d_I^2 + d_Q^2 = 2, \text{ and we can write:}$$

$$I = \sqrt{2}\left(\frac{d_I}{\sqrt{2}}\cos(wt+\phi) + \frac{d_Q}{\sqrt{2}}\sin(wt+\phi)\right)$$

$$I = \sqrt{2}(\cos\theta\cos(wt+\phi) + \sin\theta\sin(wt+\phi))$$

$$I = \sqrt{2}(\cos(wt+\phi-\theta),$$

where $$\cos\theta = \frac{d_I}{\sqrt{2}}, \sin\theta = \frac{d_Q}{\sqrt{2}}.$$

It follows that $$Q = \sqrt{2}\sin(wt+\phi-\theta),$$

so that $$s = i + jQ = \sqrt{2}e^{j(wt+\phi-\theta)}$$

with $$e^{j\theta} = \frac{1}{\sqrt{2}}(d_I + jd_Q)$$

For down-conversion, assume that the local oscillator 104 (LO) is perfectly tuned to the transmitter frequency ω. Thus, the transmitter and receiver are frequency locked but not necessarily phase locked so as to provide, in this embodiment, an incoherent system. In more general terms, the local oscillator is frequency locked to a frequency also utilized by the transmitter and, in general, is frequency locked with respect to the same or a multiple of some frequency utilized by the transmitter.

Then let $$s_{LO}=\cos\omega t - j\sin\omega t = e^{-j\omega t},$$

and let $S_{bb}$ be the baseband signal after down-conversion at 106. Then, $$s_{bb} \equiv ss_{LO} = \sqrt{2}\, e^{j(\omega t + \phi - \theta)} e^{-j\omega t}$$
$$= \sqrt{2}\, e^{j(\phi-\theta)} e^{j\omega t} e^{-j\omega t}$$
$$= \sqrt{2}\, e^{j(\phi-\theta)}.$$

For despreading at 108, $$s_{bb} = \sqrt{2}\, e^{-j\theta} e^{j\phi} = (d_I - jd_Q)e^{j\phi} = d e^{j\phi} \quad (1)$$
$$= d(b_I - jb_Q)e^{j\phi} = \sqrt{2}\, d e^{-j\psi} e^{j\phi},$$

where $$e^{j\psi} = \frac{1}{\sqrt{2}}(b_I + jb_Q)$$

Then, letting $S_{mod}$ represent the complex modulation symbol, which is one bit of the normalized, down converted, despread signal, we have $$s_{mod} = \frac{1}{\sqrt{2}} e^{j\psi} s_{bb} = \frac{1}{\sqrt{2}} \sqrt{2}\, d e^{j\psi} e^{-j\psi} e^{j\phi} = d e^{j\phi}.$$

Demodulation is accomplished by constructing a complex Walsh symbol $s_W$ consisting of 64 complex modulation symbols $S_{mod}$, that is, $$s_W = e^{j\phi}(d_0, d_1, \ldots d_{63}),$$

where the 64 consecutive Walsh-modulated information bits are labeled $(d_0, d_1, \ldots d_{63})$. The dot product of this complex Walsh symbol with each of the 64 possible Walsh symbols is then computed. In the ideal case of no noise, all of these dot products would be zero except for that with the winning symbol.

$$w = (w_0, w_1, \ldots w_{63}) = (d_0, d_1, \ldots d_{63}),$$

for which the dot product equals $64 e^{j\phi}$. The 64-bit winning Walsh symbol W is then transformed to obtain six information bits. The phase difference $\phi$ between transmitter and receiver can be obtained from the dot product $s_W \cdot W$.

Now, the fact that the down-conversion is implemented digitally is utilized. Since the IF rate is twice the chip rate, and in the case where there are eight samples per chip, the sampling rate of the received I signal is $$T_s = \frac{1}{8f_r} = \frac{1}{4f},$$

where $f_r$ is the chip rate and f is the IF. The sampling rate can be increased, if desired, to improve distance ranging accuracy. The signal delay in forming the quadrature signal Q is $T_s$, so that in this embodiment samples of Q are just samples of I delayed by one sample period. This sampling, synchronized with the LO signal $s_{LO}$ at the receiver, allows for simplification of the above down converted signal $s_{bb} = I_{bb} + jQ_{bb}$ because successive samples of $s_{LO}$ form the periodic sequence $\{I, -j, -I, j\}$. Multiplication of these samples of $s_{LO}$ by successive samples of $s = I + jQ$ results in a sequence for $s_{bb} = I_{bb} + jQ_{bb}$ which has the periodic form $$\{I+jQ, Q-jI, -I-jQ, -Q+jI\}.$$

Explicitly, under the assumption of chip synchronization of transmitter with receiver, the eight samples labeled 0–7 of $s_{bb}$ from one chip can be expressed in the following table:

|  | 0 | 1 | 2 | 3 | 4 | 5 | 6 | 7 |
|---|---|---|---|---|---|---|---|---|
| $I_{bb}$ | $I(0)$ | $Q(T_s)$ | $-I(2T_s)$ | $-Q(3T_s)$ | $I(4T_s)$ | $Q(5T_s)$ | $-I(6T_s)$ | $-Q(7T_s)$ |
| $Q_{bb}$ | $Q(0)$ | $-I(T_s)$ | $-Q(2T_s)$ | $I(3T_s)$ | $Q(4T_s)$ | $-I(5T_s)$ | $-Q(6T_s)$ | $I(7T_s)$ |

Since Q is formed from I by a quarter-period delay, i.e., $$Q((2n+1)T_s) = I(2nT_s),$$

it can be observed from the table that a two-fold redundancy for both $I_{bb}$ and $Q_{bb}$ reduces the number of independent samples per chip by a factor of 2 from eight to four.

For instance, choose the four independent samples of $I_{bb}$ in a chip to be:

$$\{I(0), -I(2T_s), I(4T_s), -I(6T_s)\},$$

so that $$I_{bb}(n) = (-1)^n I(2nT_s).$$

For the independent samples of $Q_{bb}$, it is then necessary to choose the odd-numbered samples $$\{-I(T_s), I(3T_s), -I(5T_s), I(7T_s)\},$$

so that $$Q_{bb}(n) = (-1)^{n+1} I((2n+1)T_s)$$

The motivation for this choice is that it ensures that all of the samples are taken from the same chip. For example, if $Q_{bb}(0)$ had been chosen to be $Q(0)$ instead of $-I(T_s)$, then, since t=0 corresponds to the beginning of the chip, $Q(0) = I(-T_s)$ would contain data from the previous chip and, possibly, from the previous data bit. This would result in a sample which could produce an incorrect demodulation.

Consolidating these choices for $I_{bb}$ and $Q_{bb}$ results in the four independent samples of $s_{bb} = I_{bb} + jQ_{bb}$ per chip being represented as)

$$\{I(0)-jI(T_s), -I(2T_s)+jI(3T_s), I(4T_s)-jI(5T_s), -I(6T_s)+jI(7T_s)\},$$

so that $$s_{bb}(n) = (-1)^n [I(2nT_s) - jI((2n+1)T_s)]. \quad (2)$$

Successful despreading and demodulation can occur using these samples as described subsequently.

Substitution of $t=2nT_s$, and $t=(2n+1)T_s$ in equation (1) for $I(t)$ yields $$s_{bb}(n) = I_{bb}(n) + jQ_{bb}(n)$$
$$= (d_I(2nT_s)\cos\phi + d_Q(2nT_s)\sin\phi) +$$
$$j(d_I([2n+1]T_s)\sin\phi - d_Q([2n+1]T_s)\cos\phi).$$

Despreading is accomplished by forming the following product $$s_{mod} \equiv I_{mod} + jQ_{mod} = \frac{1}{2}(b_I + jb_Q)(I_{bb} + jQ_{bb}) \quad (3)$$
$$= \frac{1}{2}[(b_I I_{bb} - b_Q Q_{bb}) + j(b_Q I_{bb} + b_I Q_{bb})].$$

In the above formula for $s_{bb}$, even though $d_I$ and $d_Q$ are sampled at different times in $I_{bb}(n)$ and $Q_{bb}(n)$, all samples lie within the same chip due to chip synchronization and our sampling choice. Despreading may work as follows: (where $b_I^2 = b_Q^2$).

$$2s_{mod} = b_I(d_I\cos\phi + d_Q\sin\phi) - b_Q(d_I\sin\phi - d_Q\cos\phi) +$$
$$j[b_Q(d_I\cos\phi + d_Q\sin\phi) + b_I(d_I\sin\phi - d_Q\cos\phi)]$$
$$= db_I(b_I\cos\phi + b_Q\sin\phi) - db_Q(b_I\sin\phi - b_Q\cos\phi) +$$
$$j[db_Q(b_I\cos\phi + b_Q\sin\phi) + db_I(b_I\sin\phi - b_Q\cos\phi)]$$
$$= d(b_I^2\cos\phi + b_I b_Q\sin\phi - b_I b_Q\sin\phi + b_Q^2\cos\phi +$$
$$j[b_I b_Q\cos\phi + b_Q^2\sin\phi + b_I^2\sin\phi - b_I b_Q\cos\phi])$$
$$= 2d(\cos\phi + j\sin\phi),$$

so that a sample of the normalized, down converted, despread signal with modulation symbol d is $$s_{mod}=de^{j\phi},$$

Combination of formulas (2) and (3) yields the explicit formula for the sampled, despread signal.

$$s_{mod}(n)=(-1)^n\frac{1}{2}\{b_I(2nT_s)+b_Q([2n+1]T_s)I([2n+1]T_s)+$$
$$j(b_Q(2nT_s)I(2nT_s)-b_I([2n+1]T_s)I([2n+1]T_s))\}.$$

There are four of these samples per chip and sixteen per modulation symbol. The following table illustrates this formula for the four samples of a single chip, in which time is expressed in units of $T_s$. However, to further improve auto-ranging accuracy, additional samples per chip, e.g., eight samples per chip could be utilized.

|  | 0 | 1 | 2 | 3 |
|---|---|---|---|---|
| $2I_{mod}$ | $b_I(0)I(0) - b_Q(0)I(0)$ | $-(b_I(2)I(2) + b_Q(3)I(3))$ | $b_I(4)I(4) - b_Q(5)I(5)$ | $-(b_I(6)I(6) + b_Q(7)I(7))$ |
| $2Q_{mod}$ | $B_Q(0)I(0) - b_I(1)I(1)$ | $-(B_Q(2)I(2) - b_I(3)I(3))$ | $B_Q(4)I(4) - b_I(5)I(5)$ | $-(B_Q(6)I(6) - b_I(7)I(7))$ |

The preceding analysis suggests a strategy for improvement of demodulation accuracy. It will be noted that the eight samples taken in each chip are asymmetrically located within the chip. The first sample, taken at time $8nT_s$, lies at the left edge of the chip. The last sample, taken at time $(8n+7)T_s$, lies at a time $T_s=f_r/8$ from the right edge of the chip. A small chip synchronization error or timing error could cause the first sample of the chip to occur in the previous chip, possibly in the previous modulation bit, resulting in an incorrect demodulation for that sample. A more error-tolerant demodulation scheme is realized if all samples are shifted to the right, i.e., ahead in time, by an interval of $T_s/2=f_{r}/16=f/8$, where f is the intermediate frequency. The eight samples in a chip will now be symmetrically located, taken at times $(8n+(2i+1)/2)T_s$, for $i \in \{0,1,\ldots,7\}$. This results in a computed additional phase difference between transmitter and receiver of 45°, that is, $\phi \rightarrow \phi+45°$, corresponding to the one-eighth cycle sampling delay. This bias can be calibrated away with software in an absolute phase determination, but it is entirely irrelevant in a relative phase determination, such as between channel and reference in a tracking system.

The technique of the present invention may be simulated by various means and simulations have been performed in Mathematica, Signal Processing Works, and C++ computer programming languages indicate that the concept of the invention is sound. Demodulation of Walsh-modulated data is a proven technique. In the preferred embodiment discussed hereinbefore, accuracy of the determination of relative phase is dependent upon accuracy of this demodulation. Hardware can be used to realize the simulations.

Figure 9:
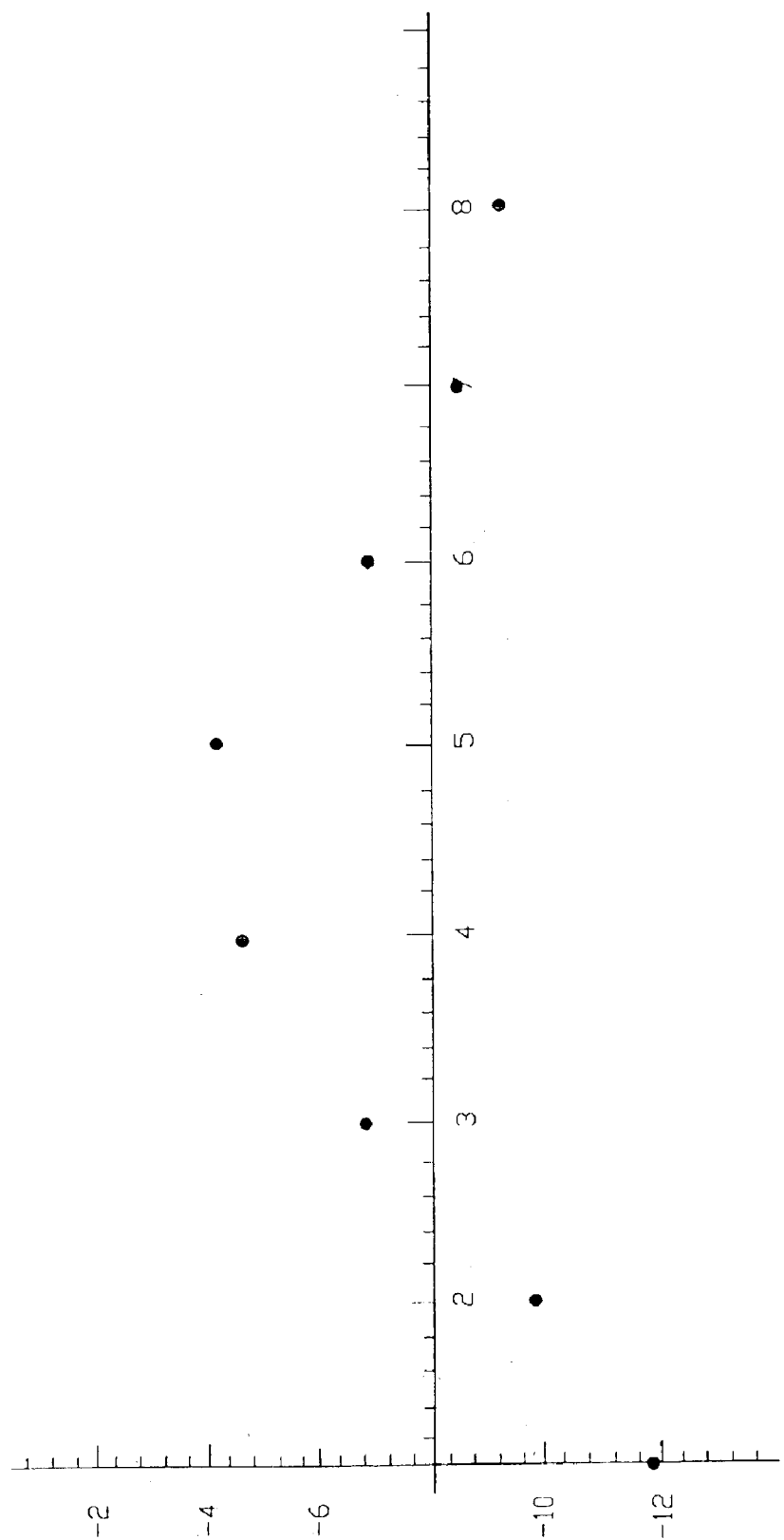
FIG. 9 is a plot showing the signal-to-noise ratio (SNR) for a winning symbol as a function of receiver code misalignment with the best receiver alignment occurring for a shift of five samples in accord with the present invention.
Figure 10:
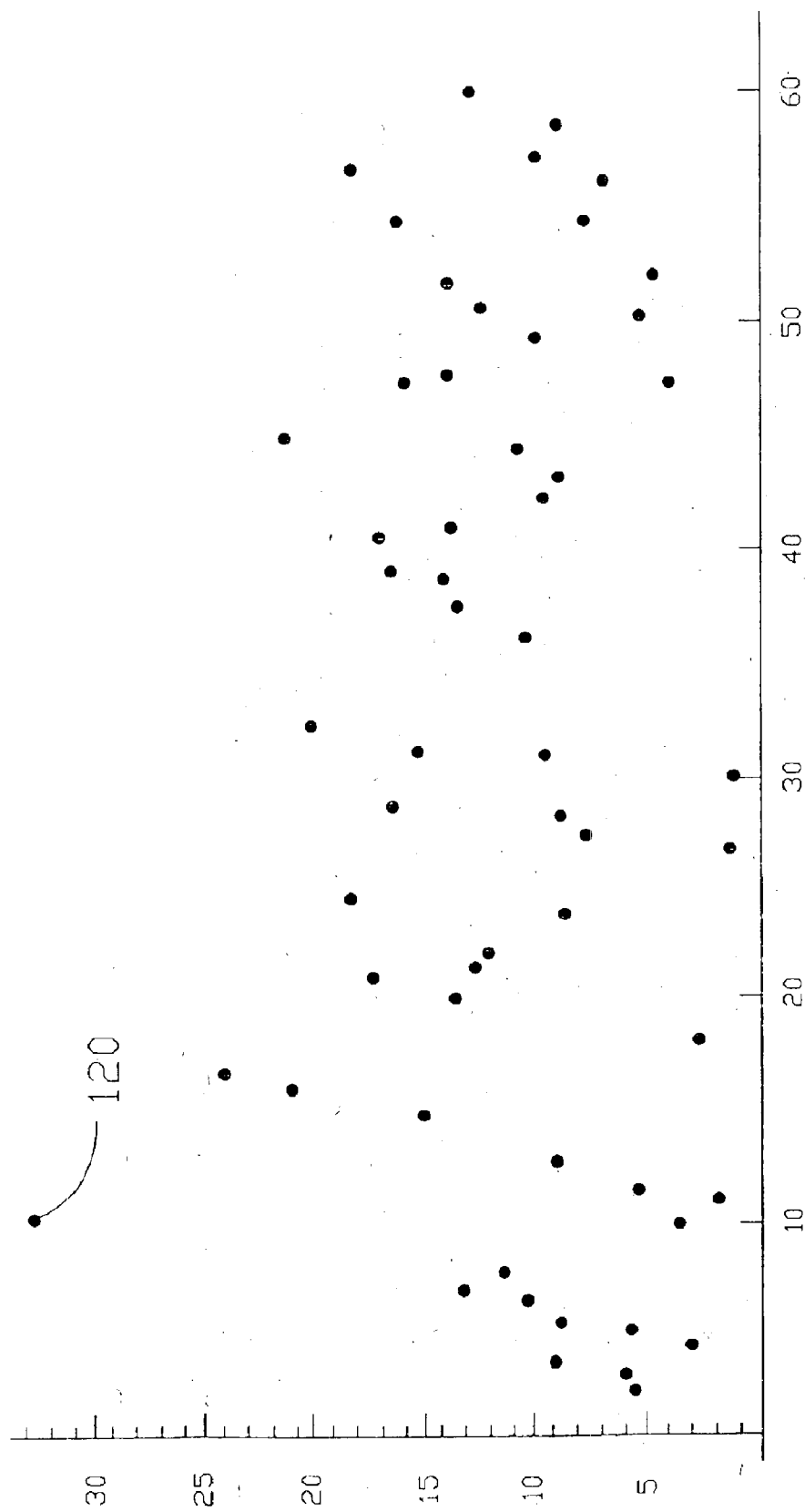
FIG. 10 is a plot of amplitude (square root of power) in each of 64 Walsh symbols for a shift of two samples, three shifts away from receiver alignment in accord with the present invention.
Figure 11:
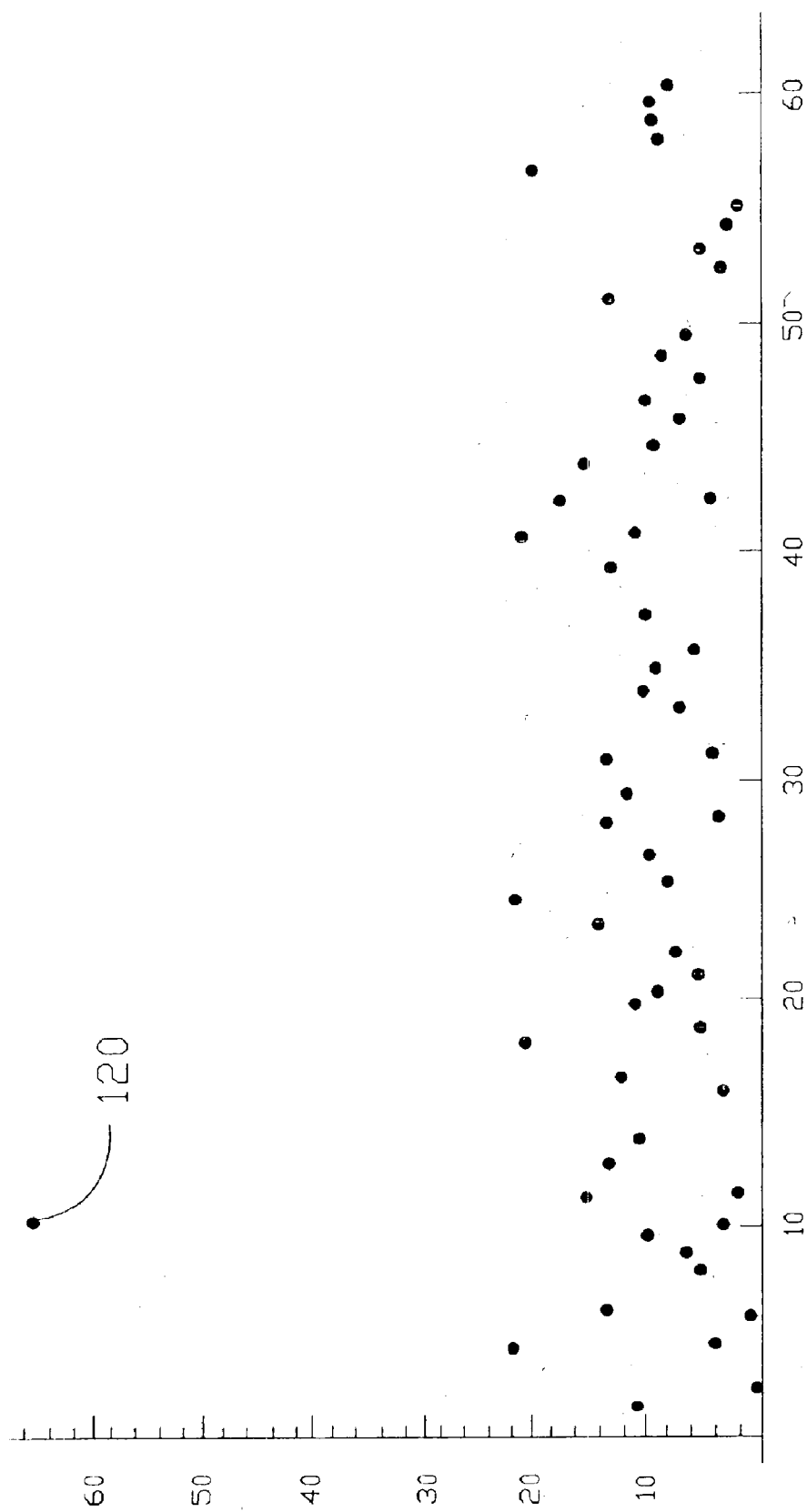
FIG. 11 is a plot of amplitude (square root of power) in each of the 64 Walsh symbols of FIG. 10 for a shift of five samples for best receiver alignment in accord with the present invention.

FIGS. 9, 10, and 11 illustrate tracking of the transmitter PN code by the receiver. The code has been acquired and must be shifted slightly in accordance with early and late correlation signals to maintain synchronization. In these plots, the amplitude of the signal is 9 dB below the standard deviation of the thermal noise. There is a frequency deviation of 500 Hz, which is about 200 Hz more than the maximum expected frequency deviation. There is a phase jitter of 11.4 degrees on the transmitted signal. The best alignment with the code occurs for a shift of five samples. FIG. 9 shows the SNR (power in the winning Walsh symbol divided by power in the 63 losing symbols) for shifts of up to four samples (one half-chip) from alignment. FIGS. 10 and 11 show amplitude (square-root of power) in each of the 64 Walsh symbols for two of the shifts in FIG. 9, namely, shifts of two and five samples, respectively. It is seen that the winning Walsh symbol is easily detectable in FIG. 10 and in FIG. 11 although in FIG. 11 the signal-to-noise ratio is dramatically improved.

In summary, three-element array 10 is operable over a theoretical hemisphere (i.e., 180 degree field of view) in conjunction with receiver 30 that has three channels to simultaneously receive the transmitted signal with each of the three antenna elements. The actual operational field of view is dependent on the antenna system used. For example, a three-element array of microstrip patch antennas can provide an actual operational field of view of about 140 degrees. If the distance between the transmitter and array 10 can be measured via a one-way ranging system, or other intersection means such as knowledge of a particular track that the tracked item will follow, then only one direction vector/3-element antenna array system/receiver is needed to determine the transmitter position. Otherwise, two arrays 10 can be utilized to produce two 3-D vectors from each respective array 10, whose relative spacing is known, to thereby locate the transmitter. The vectors may be produced by determining the phase differences between the array elements by any means for measuring phase differences between signals although a preferred implementation is disclosed that is inexpensive, operates quickly, and is conveniently useable with already existing communication systems. In a preferred embodiment, a technique is utilized for extracting the phase difference between the transmitter and receiver in a noncoherent demodulation scheme and using the phase difference to produce a unit vector for detecting the transmitter location. The operation requires less than one second and may typically have an accuracy as or better than most commercial GPS locating systems. However, the accuracy can be improved if desired depending on the mode of operation.

Figure 12:
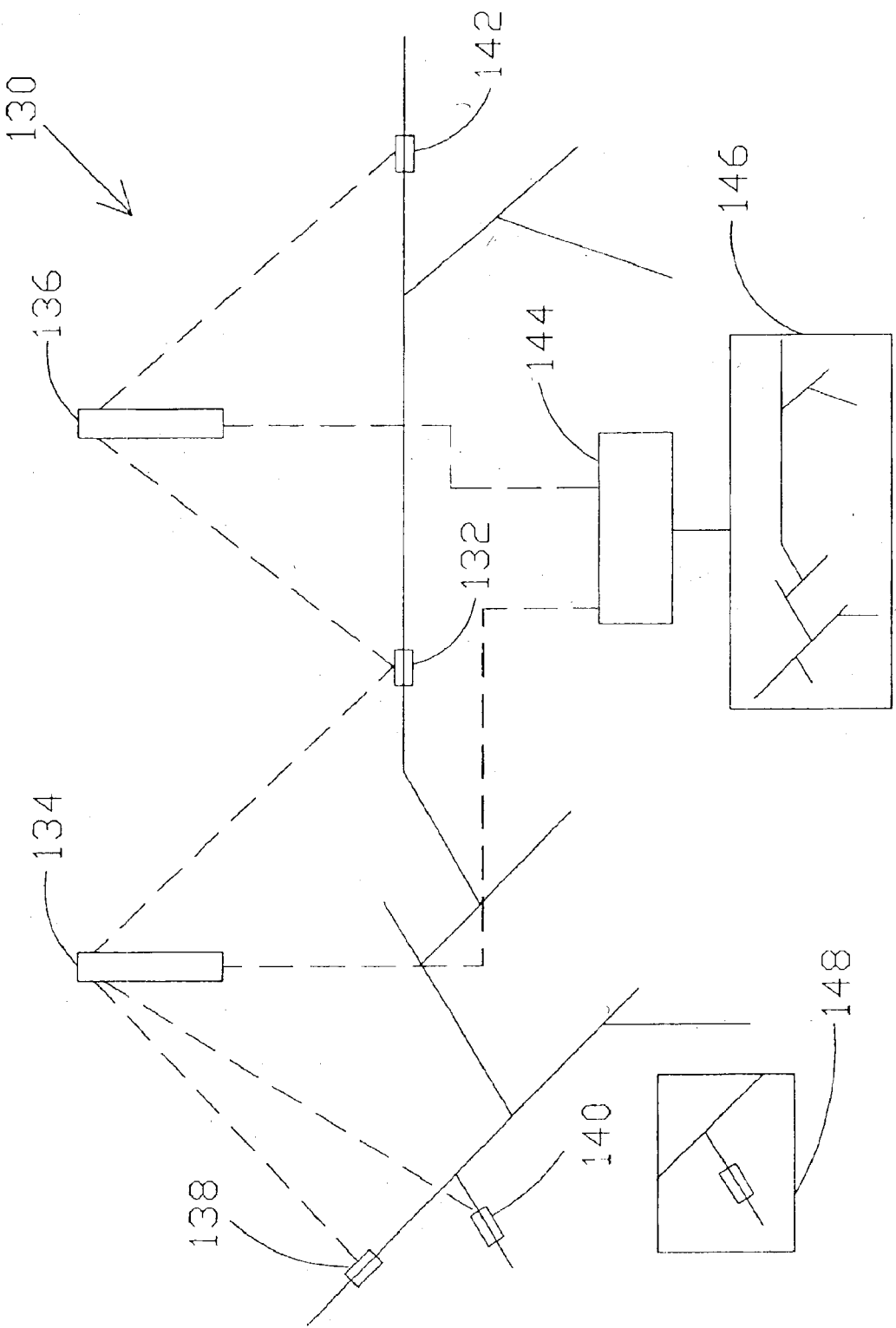
FIG. 12 is a graphical representation of a system for utilizing a detector in accord with the present invention.

FIG. 12 discloses one of many possible position detection/tracking, systems of the present invention for detecting mobile targets, with transmitter which may be built into the vehicle, such as automobiles, containers, trucks, busses, as well as cellular telephones, tri-band telephones, and the like, which may be in a network range such as a cellular telephone range, pager network, satellite network, or any telematic system. For instance, the present invention could utilize two vectors to determine the location of vehicle 132 as discussed above because vehicle 132 is in range of both tower receivers 134 and 136. Vehicle 138 and 140 could located/tracked by utilizing a single vector from receiver 134 and the respective ranging distances along the vector from the transmitters to vehicles 138 and 140 as determined by making very accurate time measurements of the time delay between the incoming pseudo noise spreading code and the same code stored in the receiver, preferably as discussed above by oversampling the incoming baseband signal in order to increase the time resolution or one-way range accuracy. Likewise the position of 142 could be determined with a vector and the ranging distance. As well, if it is assumed that an automobile, or the like, is on a geological surface of known elevation and position, such as a road, then a single vector could be utilized and the intersection determined with the known elevation and position of the road, relative dimensions of parking buildings, and the like, if desired without the need to determine the range distance or in conjunction with the range distance for increased reliability/accuracy. The information could be provided/transmitted/cabled to a computer, such as computer 144, and the relative positions of the tracked vehicles, speed, direction, and the like could be stored, computed as necessary, and, if desired, displayed as a map in display 146. Likewise, the position of a single vehicle and/or other vehicles could be provided in display 148 which may be mounted in any vehicle such as vehicle 140. While the above is one possible example of application, it will be understood that the present invention may be utilized in a myriad of applications.

The disclosed technique in accord with the present invention of extracting the direction vector from a measure of phase differences in a three-element preferably right triangular antenna array is operative or adaptable to a wide variety of coding and data modulation formats. The demodulation and phase extraction scheme in a CPFSK (continuous phase frequency shift keying) TDMA (time division multiple access) system, for example, would be different than that of a QPSK CDMA (code division multiple access system, but the procedure would be the same after phase extraction. The invention could be utilized to track an astronaut in extravehicular activity in communication with the Space Station and in communication with it. If a mobile phone user were in communication with two base stations each equipped with a receiver and a three element antenna array, the user's location could be determined from a 911 emergency call. If the mobile phone user were in communication with only one base station, the system as described could locate the user's direction. In the particular embodiment of the invention in an incoherent receiver utilizing spread spectrum and orthogonal coding, the distance to the user could be determined examining the time delay to align the received PN code with the receiver's locally generated PN code.

The system is passive in that it may utilize, in a preferred embodiment, an existing communications signal to extract location of the source. It therefore has the advantage of transmitting no power which could interfere with electronic equipment at an adjacent or nearby location. The system is simple, small, and inexpensive. In the particular embodiment of the invention, using spread spectrum and orthogonal coding, the system has high tolerance to a noisy environment with multipath signals.

In general, it will be understood that such terms as "up," "down," "vertical," and the like, are made with reference to the drawings and/or the earth and that the devices may not be arranged in such positions at all times depending on variations in operation, transportation, mounting, and the like. As well, the drawings are intended to describe the concepts of the invention so that the presently preferred embodiments of the invention will be plainly disclosed to one of skill in the art but are not intended to be manufacturing level drawings or renditions of final products and may include simplified conceptual views as desired for easier and quicker understanding or explanation of the invention. As well, the relative size/type/arrangement of the components may be greatly different from that shown and still be in accord with the spirit of the invention.

Therefore, the foregoing disclosure and description of the invention are illustrative and explanatory thereof, and various changes in the method steps and also the details of the apparatus may be made within the scope of the appended claims without departing from the spirit of the invention.

What is claimed is:

1. A passive system for locating a transmitter, said transmitter producing a transmitter signal of a known frequency and known modulation scheme, said system comprising:

at least one antenna array having a first antenna element, a second antenna element, and a third antenna element, said first antenna element being operable for receiving a first received signal from said transmitter, said second antenna element being operable for receiving a second received signal from said transmitter, said third antenna being operable for receiving a third signal from said transmitter; and electronic circuitry for said antenna array to determine a first phase difference and a second phase difference between said first received signal, said second received signal, and said third received signal, said electronic circuitry being operable for utilizing said first phase difference and said second phase difference for determining location information related to a vector oriented in a direction of said transmitter with respect to said at least one antenna array, wherein said electronic circuitry comprises:

a spread spectrum receiver with a first receiver channel for processing said first received signal from said first antenna element, a second receiver channel for processing said second received signal from said second antenna element, and a third receiver channel for processing said third received signal from said third antenna element; and a first finger for said first receiver channel, a second finger for said second receiver channel, and a third finger for said third receiver channel, each of said first finger, said second fingers and said third finger being operable for performing a Fast Walsh Transform to determine a winning Walsh symbol based on magnitude and not phase of a Walsh vector.

2. A method for passively detecting the location of a transmitter said transmitter being operable for transmitting a transmitter signal, said method comprising:

receiving said transmitter signal with a first antenna array comprising a first antenna element that produces a first received signal, a second antenna element that produces a second received signal, and a third antenna element that produces a third received antenna signal, and wherein said transmitter signal has a known frequency and a known modulation scheme;

determining a first phase difference and a second phase difference between said first received signal, said second received signal, and said third received signal;

utilizing said first phase difference and said second phase difference to determine location information related to a first vector in a direction of said transmitter with respect to said first antenna array, wherein said first phase difference is identified by a symbol $\Phi_1$ and said second phase difference is identified by a symbol $\Phi_2$, wherein said first vector is defined as $(\sin\theta_1\cos\phi_1, \sin\theta_1\sin\phi_1, \cos\theta_1)$, wherein said location information is determined by using the equations $$\phi_1 = \arctan\left(\frac{\Phi_2}{\Phi_1}\right)$$

and $$\theta_1 = \arcsin\left(\frac{\sqrt{\Phi_1^2 + \Phi_2^2}}{\pi}\right);$$

receiving said transmitter signal with a second antenna array spaced from said first antenna array by a known distance, said second antenna array comprising a fourth antenna element that produces a fourth received signal, a fifth antenna element that produces a fifth received signal, and a sixth antenna element that produces a sixth received antenna signal;

determining a third phase difference and a fourth phase difference between said fourth received signal, said fifth received signal, and said sixth received signal, wherein said third phase difference is identified by a symbol $\Phi_3$ and said fourth phase difference is identified by a symbol $\Phi_4$, wherein said second vector is defined as $(\sin\theta_2\cos\phi_2, \sin\theta_2\sin\phi_2, \cos\theta_2)$, wherein said additional location information is determined by using the equations $$\phi_2 = \arctan\left(\frac{\Phi_4}{\Phi_3}\right)$$

and $$\theta_2 = \arcsin\left(\frac{\sqrt{\Phi_3^2 + \Phi_4^2}}{\pi}\right);$$

and utilizing said third phase difference and said fourth phase difference to determine additional location information related to a second vector oriented in a second direction of said transmitter with respect to said second antenna array.

3. A method for passively detecting the location of a transmitter, said transmitter being operable for transmitting a transmitter signal, said method comprising:

receiving said transmitter signal with a first antenna array comprising a first antenna element that produces a first received signal, a second antenna element that produces a second received signal, and a third antenna element that produces a third received antenna signal, and wherein said transmitter signal has a known-frequency and a known modulation scheme;

determining a first phase difference and a second phase difference between said first received signal, said second received signal, and said third received signal;

utilizing said first phase difference and said second phase difference to determine location information related to a first vector in a direction of said transmitter with respect to said first antenna array;

receiving said transmitter signal with a second antenna array spaced from said first antenna array by a known distance, said second antenna array comprising a fourth antenna element that produces a fourth received signal, a fifth antenna element that produces a fifth received signal, and a sixth antenna element that produces a sixth received antenna signal;

determining a third phase difference and a fourth phase difference between said fourth received signal, said fifth received signal, and said sixth received signal;

utilizing said third phase difference and said fourth phase difference to determine additional location information related to a second vector oriented in a second direction of said transmitter with respect to said second antenna array;

providing a local oscillator which is frequency locked with respect to said transmitter frequency but not phase locked with respect to said transmitter frequency;

processing said first received signal, and said second received signal, and said third received signal in a spread spectrum receiver;

downconverting and despreading said first received signal, said second received signal and said third received signal in said spread spectrum receiver;

tracking multiple transmitter paths of said first received signal, said second received signal, and said third received signal;

separately time multiplexing-said multiple transmitter paths for each of said first received signal, said second received signal, and said third received signal;

indexing multipath components for said first received signal, said second received signal, and said third received signal with respect to timing of a locally generated PN sequence;

comparing an indexed multipath signal of said first received signal to a corresponding indexed multipath signal of said second received signal and a corresponding indexed multipath signal of said third received signal to produce a multipath comparison;

utilizing said multipath comparison to determine said first phase difference and said second phase difference; and storing a plurality of modulation symbols, and performing a Fast Walsh Transform on said plurality of modulation symbols to determine a winning symbol.

4. The method of claim 3, further comprising comparing said winning signal to said plurality of symbols to determine a signal to noise ratio.

5. The method of claim 4, further comprising utilizing said signal to noise ratio to determine whether a local PN-generator is aligned with respect to said transmitted signal.

6. A method for a passive system operable for determining location characteristics of a plurality of moveable transmitters, each of said plurality of moveable transmitters producing a transmitter signal, each of said plurality of moveable transmitters having a known transmitter frequency and known transmitter modulation scheme, said system comprising:

provnding a plurality of receivers spaced apart wherein each of said plurality of moveable transmitters is receivable by at least one of said plurality of receivers;

providing each receiver with an antenna array having three separate antenna elements;

determining two transmitter signal phase shifts at said three separate antenna elements with respect to a first moveable transmitter and a first receiver;

utilizing said two transmitter signal phase shifts to determine information related to a vector oriented in a first direction of said first moveable transmitter with respect to said first receiver; and utilizing a receiver generated PN signal to determine a distance from said first receiver to said first moveable transmitter, and utilizing said distance with said information related to said first direction to determine a position of said first moveable transmitter.

7. A method for a passive system operable for determining location characteristics of a plurality of moveable transmitters, each of said plurality of moveable transmitters producing a transmitter signal, each of said plurality of moveable transmitters having a known transmitter frequency and known transmitter modulation scheme, said system comprising:

providing a plurality of receivers spaced apart wherein each of said plurality of moveable transmitters is receivable by at least one of said plurality of receivers;

providing each receiver with an antenna array having three separate antenna elements;

determining two transmitter signal phase shifts at said three separate antenna elements with respect to a first moveable transmitter and a first receiver;

utilizing said two transmitter signal phase shifts to determine information related to a vector oriented in a first direction of said first moveable transmitter with respect to said first receiver; and obtaining a possible path of travel of said first moveable transmitter, and utilizing said first direction and said possible path of travel for determining a position of said first moveable transmitter.

8. A method for a passive system operable for determining location characteristics of a plurality of moveable transmitters, each of said plurality of moveable transmitters producing a transmitter signal, each of said plurality of moveable transmitters having a known transmitter frequency and known transmitter modulation scheme, said system comprising:

providing a plurality of receivers spaced apart wherein each of said plurality of moveable transmitters is receivable by at least one of said plurality of receivers and wherein each of said plurality of receivers comprises a noncoherent receiver;

providing each receiver with an antenna array having three separate antenna elements;

determining two transmitter signal phase shifts at said three separate antenna elements with respect to a first moveable transmitter and a first receiver; and utilizing said two transmitter signal phase shifts to determine information related to a vector oriented in a first direction of said first moveable transmitter with respect to said first receiver.

9. A method for modifying an existing communication system comprising a plurality of moveable transceivers and a plurality of affixed transceivers to provide location information related to said plurality of moveable transceivers, said existing communication system being operable for transmitting a data modulated signal via an electromagnetic wave from said plurality of moveable transceivers to said plurality of affixed transceivers, said electromagnetic wave having a known wavelength, a known transmitter frequency, and a known transmitter modulation scheme, said method comprising:

mounting an antenna array at each of said affixed transceivers each antenna array having three antenna elements spaced apart by an integer times one-half of said wavelength, said three antenna elements being operable for producing a first received data modulated signal, a second received data modulated signal, and a third received data modulated signal in response to said data modulated signal from a first moveable transceiver of said plurality of moveable transceivers;

providing a receiver with each antenna array for receiving said data modulated signal from said first of said plurality of moveable transceivers, said receiver being operable for measuring a first phase difference and a second phase difference between said first received data modulated signal, said second received data modulated signal, and said third received data modulated signal;

determining information related to a vector oriented in a first direction of said first moveable transceiver from said first phase difference and said second phase difference;

utilizing said information related to said first direction for determining a first location of said first moveable transceiver; and determining a distance from said receiver to said first moveable transceiver, and determining said first location of said first moveable transceiver by utilizing said first direction and said distance.

10. A method for modifying an existing communication system comprising a plurality of moveable transceivers and a plurality of affixed transceivers to provide location information related to said plurality of moveable transceivers, said existing communication system being operable for transmitting a data modulated signal via an electromagnetic wave from said plurality of moveable transceivers to said plurality of affixed transceivers, said electromagnetic wave having a known wavelength, a known transmitter frequency, and a known transmitter modulation scheme, said method comprising:

mounting an antenna array at each of said affixed transceivers, each antenna array having three antenna elements spaced apart by an integer times one-half of said wavelength, said three antenna elements being operable for producing a first received data modulated signal, a second received data modulated signal, and a third received data modulated signal in response to said data modulated signal from a first moveable transceiver of said plurality of moveable transceivers;

providing a noncoherent receiver with each antenna array for receiving said data modulated signal from said first of said plurality of moveable transceivers, said receiver being operable for measuring a first phase difference and a second phase difference between said first received data modulated signal, said second received data modulated signal, and said third received data modulated signal, and wherein said receiver comprises a local oscillator such that a said local oscillator of said receiver has a local oscillator frequency which is frequency locked with respect to said transmitter frequency but which is not phase locked with respect to said transmitter frequency;

determining information related to a vector oriented in a first direction of said first moveable transceiver from said first phase difference and said second phase difference; and utilizing said information related to said first direction for determining a first location of said first moveable transceiver.

* * * * *